United States Patent
Jiang et al.

(10) Patent No.: US 10,519,305 B2
(45) Date of Patent: Dec. 31, 2019

(54) ETHYLENE COPOLYMER WITH IN-SITU OIL PRODUCTION

(71) Applicant: ExxonMobil Chemical Patents Inc., Baytown, TX (US)

(72) Inventors: Peijun Jiang, League City, TX (US); Ronald R. Thackston, Dickinson, TX (US); John D. Costales, Friendswood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/744,908

(22) PCT Filed: Jul. 5, 2016

(86) PCT No.: PCT/US2016/040959
§ 371 (c)(1),
(2) Date: Jan. 15, 2018

(87) PCT Pub. No.: WO2017/034680
PCT Pub. Date: Mar. 2, 2017

(65) Prior Publication Data
US 2018/0208757 A1 Jul. 26, 2018

Related U.S. Application Data

(60) Provisional application No. 62/209,560, filed on Aug. 25, 2015.

(51) Int. Cl.
*C08L 23/16* (2006.01)
*C08F 210/16* (2006.01)

(52) U.S. Cl.
CPC ............ *C08L 23/16* (2013.01); *C08F 210/16* (2013.01); *C08F 2500/05* (2013.01); *C08F 2500/09* (2013.01); *C08F 2500/17* (2013.01); *C08F 2500/21* (2013.01); *C08L 2205/025* (2013.01); *C08L 2205/06* (2013.01); *C08L 2207/324* (2013.01)

(58) Field of Classification Search
CPC .......... C08L 2207/324; C08L 2205/025; C08F 2500/09
See application file for complete search history.

(56) References Cited

U.S. PATENT DOCUMENTS

| | | | |
|---|---|---|---|
| 5,120,790 A * | 6/1992 | Yu | C08F 290/061 525/186 |
| 2004/0214953 A1 | 10/2004 | Yamada et al. | |
| 2008/0287620 A1 | 11/2008 | Ravishankar | |
| 2009/0318640 A1 | 12/2009 | Brant et al. | |
| 2010/0152383 A1 | 6/2010 | Jiang et al. | |
| 2010/0152390 A1 | 6/2010 | De Gracia et al. | |
| 2014/0213734 A1 | 7/2014 | Jiang | |
| 2014/0213745 A1 | 7/2014 | Jiang et al. | |

* cited by examiner

*Primary Examiner* — Jeffrey C Mullis
(74) *Attorney, Agent, or Firm* — Chad A. Guice

(57) ABSTRACT

The present disclosure relates to an oil extended ethylene alpha-olefin composition including an olefin oligomer and an ethylene copolymer; where the olefin oligomer has a Number Average Molecular Weight of greater than about 200 g/mole; where the composition has a Shear Thinning Ratio of greater than about 100, a Phase Angle of less than about 45 degrees, a Mooney Large Viscosity (1+4@125° C.) of greater than about 40 Mooney units, and a Mooney Large Relaxation Area of greater than about 500 Mooney unit seconds.

6 Claims, 1 Drawing Sheet

ETHYLENE COPOLYMER WITH IN-SITU OIL PRODUCTION

CROSS-REFERENCE TO RELATED APPLICATION

The present application is a National Phase Application claiming priority to PCT Application Serial No. PCT/US2016/040959 filed Jul. 5, 2016, and claims priority to U.S. Ser. No. 62/209,560, filed Aug. 25, 2015, herein incorporated by reference.

FIELD OF THE INVENTION

This invention relates to the use of one or more metallocene catalysts or catalyst systems to produce oil extended ethylene copolymers, and the copolymers so produced.

BACKGROUND OF THE INVENTION

This invention is related to oil extended ethylene alpha-olefin or ethylene alpha-olefin and diene copolymers. Ethylene alpha-olefin elastomers, particularly ethylene-propylene-diene terpolymers (EPDM), are recognized as excellent general-purpose elastomers that are useful in a variety of applications. It is generally known that small amounts of diene units in EPDM introduce unsaturation and thus facilitate crosslinking/vulcanization of the polymer chains. The vulcanization reaction involves using one or more curing agents that causes two or more elastomeric polymer chains to cross-link chemically. The vulcanization takes place during the post-polymerization process, such as in an extruder.

The molecular weight of the ethylene elastomer is also known to affect the elastomeric properties of the composition. While higher molecular weight elastomers provide improved rubber elastic properties, the inherent high viscosity of high molecular weight ethylene elastomer creates difficulties in processability, including mixing and compounding steps. Therefore, it is common for rubber manufacturers to add process/extender oil after the polymerization, but prior to vulcanization of the ethylene elastomer to form an oil-extended rubber or elastomer product. The amount of extender oil added depends on the molecular weight of the ethylene elastomer and end-use applications. For EPDM, extender oil is typically added to reduce the apparent viscosity to a Mooney viscosity of about 100 mu or below. For high resilience applications, EPDM typically contains from about 50 to about 125 phr (parts per hundred parts resin) extender oil. Oil extension is also a feature demanded by industrial mixing operations to facilitate fast processing and mixing of EPDM, as the oil facilitates the lubrication, wetting, and proper dispersion of the ingredients.

As stated, in oil-extended EPDM manufacturing processes, the extender oil is typically blended with the ethylene copolymer post polymerization reactor. Oil introduction takes place after the reactor but before the removal of volatiles, for instance before a steam stripper. To achieve good mixing, the extender oil is often blended with the ethylene copolymer when the ethylene copolymer is still dissolved or suspended in the reaction media coming from the polymerization reactor. However, oil extension adds an extra step to manufacturing and leaves the choice of extender oil to the rubber manufacturer, not the fabricators of the rubber articles. Additional hardware is also necessary to carry out post-reactor oil addition. Accordingly, there is a need for a process of in-situ oil production in the polymerization reactor, thereby eliminating the need of additional hardware in the post polymerization reactor for oil addition. The inventors have discovered a process to incorporate in-situ oil to produce olefin oligomers and ethylene alpha-olefin elastomers. Specifically, the olefin oligomers have vinyl chain ends so that some of the oligomers are incorporated into ethylene alpha-olefin elastomer chains to form branched polymer structures. The remaining un-incorporated oligomers serve as extender oil to the elastomers. The inventors have also discovered that this process allows for controlling the levels of branching to eliminate the formation of a gelled product.

SUMMARY OF THE INVENTION

This invention in some aspects provides an oil extended ethylene alpha-olefin composition, comprising: an olefin oligomer and an ethylene copolymer; wherein the olefin oligomer has a Number Average Molecular Weight of greater than about 200 g/mole; wherein the composition has a Shear Thinning Ratio of greater than about 100, a Phase Angle of less than about 45 degrees, a Mooney Large Viscosity (1+4@125° C.) of greater than about 40 Mooney units, and a Mooney Large Relaxation Area of greater than about 500 Mooney unit·seconds.

DETAILED DESCRIPTION

Oil Extended Ethylene Copolymers

Figure 1:
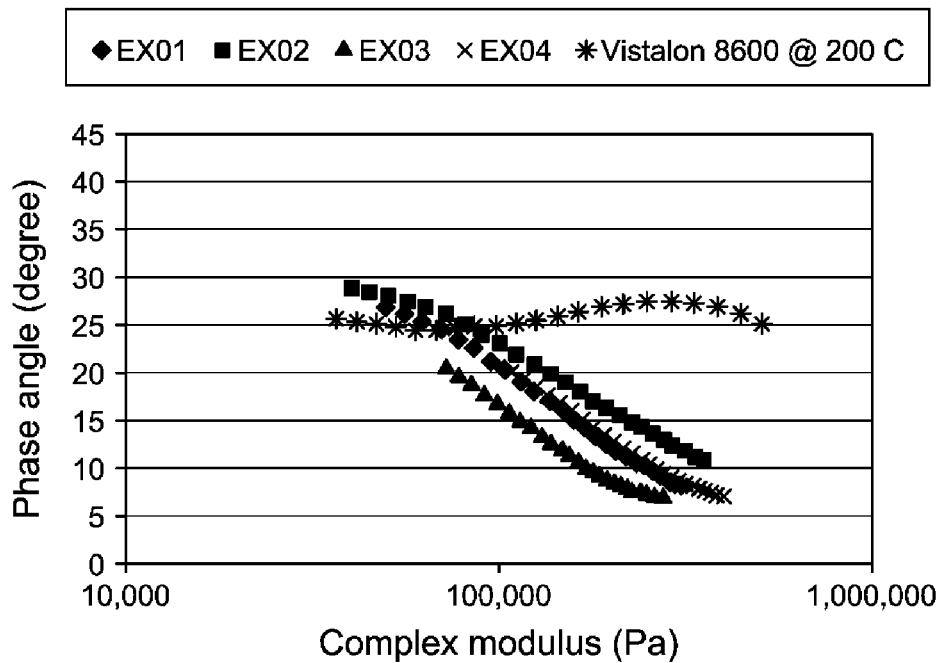
FIG. 1 is a Van Gurp-Palmen plot (phase angle vs. complex shear modulus) of the inventive ethylene copolymers produced in Examples 1 to 4 and Vistalon™ 8600.
Figure 2:
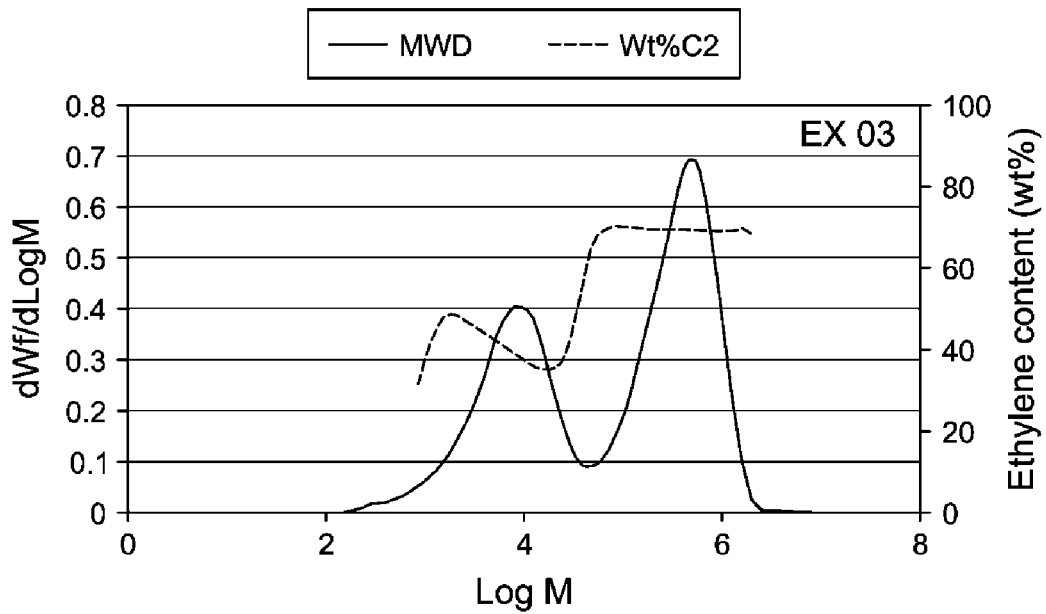
FIG. 2 shows the bimodal distributions in both molecular weight and ethylene content for the ethylene copolymer produced in Example 3.

This invention in some aspects is related to oil extended ethylene alpha-olefin or ethylene alpha-olefin and diene copolymers. The oil comprises olefin oligomers and is produced in-situ during the polymerization process of the ethylene copolymers. In one aspect, the oligomers have one or more vinyl chains end and are incorporated into ethylene alpha-olefin or ethylene, alpha-olefin and diene copolymer chains to form side arms (also referred to as branches). This invention in further aspects is related to ethylene alpha-olefin or ethylene, alpha-olefin and diene copolymers comprising ethylene, alpha-olefin and olefin oligomers, wherein at least 50% of all unsaturated chain ends of the olefin oligomer are vinyl chain ends.

In an embodiment, this invention is further related to oil extended and branched ethylene alpha-olefin or ethylene, alpha-olefin and diene copolymers. The oil extended ethylene alpha-olefin or ethylene, alpha-olefin and diene copolymers may be produced when the oligomers with at least one reactive polymerizable groups (such as allylic terminated chain end) is incorporated into an ethylene copolymer chain during the polymerization. The resulting product comprises an ethylene/oligomer copolymer with side arms derived from the incorporated oligomers. The branching structure is also referred to as comb or brush type of branching. The composition and length of the side arms depends on the composition and molecular weight of the oligomers, in a similar manner as the short chain branched (SCB) ethylene copolymer. In SCB polyethylene, incorporation of 1-butene, 1-hexene or 1-octene results in ethyl, butyl or hexyl branches, respectively, along the polymer backbone. Copolymers of ethylene, alpha-olefin and oligomer differ from the SCB polyethylene in the arm lengths and composition. As most vinyl terminated oligomers have a high molecular weight and do not have a uniform molecular weight distribution, preferably the ethylene copolymers comprising the incorporated oligomers have branches with arm length longer than 16 carbon atoms. The distribution of arm length follows a similar molecular weight distribution as the oligomers employed in the polymerization.

The ethylene copolymer typically contains from 5 to 200 phr of extender oil comprising olefin oligomer. Alternatively, oil content is in a range from about 5 to about 200 parts by weight per 100 parts by weight of ethylene alpha-olefin or ethylene, alpha-olefin and diene copolymer. The amount of the extender oil is referred as to the amount of oil comprising olefin oligomers which are not incorporated in the ethylene copolymer chains.

The inventors have discovered that the oil extended ethylene alpha-olefin elastomer has good shear thinning and melt elasticity. Specifically, the ethylene copolymers have a shear thinning ratio of 100 or more and a phase angle of 45 degrees or less when the shear rheology is measured at a temperature of 190° C. The high melt elasticity is attributed to the comb structures formed through the reinsertion of high vinyl oligomers into the ethylene copolymer backbone. The un-reacted oil is well mixed with the ethylene copolymer produced in the polymerization reactor. Production of high vinyl chain end oil in a separate reactor maximizes the formation of long chain branches (LCB) during the EPDM polymerization process.

As used herein, "extender oil" is also referred as to process oil, synthetic process oil, or oligomeric extender. The extender oil may be paraffinic, naphthenic, aromatic oils, olefin oligomers, and combinations thereof. Preferably, the extender oil comprises olefin oligomers. The olefin oligomer described above means a homo-oligomer or a co-oligomer of olefin, preferably alpha-olefin oligomers.

Olefin Oligomers in Extender Oil and/or Incorporated into Ethylene Copolymers

In various embodiments, the extender oil comprises an olefin oligomer. As noted, a portion of such olefin oligomer may additionally be incorporated into the ethylene copolymers of various embodiments, in addition to making up at least a portion of the in situ extender oil. That is, olefin oligomers described herein may both (a) be found in the extender oil and/or (b) be incorporated into the ethylene copolymer itself.

The olefin oligomer of these various embodiments exhibits one or more of the following properties.

a. The viscosity at a temperature of 190° C. (also referred to as Brookfield Viscosity) is 90,000 mPa·sec or less or 80,000 or less, or 70,000 or less, or 60,000 or less, or 50,000 or less, or 40,000 or less, or 30,000 or less, or 20,000 or less, or 10,000 or less, or 8,000 or less, or 5,000 or less, or 4,000 or less, or 3,000 or less, or 1,500 or less, or between 250 and 15,000 mPa·sec, or between 500 and 5,500 mPa·sec, or between 500 and 3,000 mPa·sec, and/or a viscosity at 60° C. of 8,000 mPa·sec or less or 7,000 or less, or 6,000 or less, or 5,000 or less, or 4,000 or less, or 3,000 or less, or 1,500 or less, or between 250 and 6,000 mPa·sec, or between 500 and 5,500 mPa·sec, or between 500 and 3,000 mPa·sec, or between 500 and 1,500 mPa·sec.

b. The viscosity at a temperature of 60° C. is 200 mPa·sec or more, preferably 400 mPa·sec or more (e.g., 500 mPa·sec or more, or even 1,000 mPa·sec or more) determined according to ASTM D3236. The viscosity at 60° C. may also be less than 20,000 mPa·sec, less than 15,000 mPa·sec, or less than 10,000 mPa·sec.

c. Mn is 200 g/mol or more (e.g., 200 g/mol to 100,000 g/mol, e.g., 200 g/mol to 75,000 g/mol, e.g., 200 g/mol to 60,000 g/mol, e.g., 300 g/mol to 60,000 g/mol, or e.g., 350 g/mol to 30,000 g/mol) (measured by 1H NMR).

d. Weight-average molecular weight (Mw) is 300 g/mol or more (measured by GPC).

e. The MWD is 1.8 or more, preferably 2.0 or more, more preferably 2.5 or more.

f. The number averaged chain length is less than 4000 carbon atoms long, preferably less than 3000 carbon atoms long, more preferably less than 2000 carbon atoms long. Alternatively, the number averaged chain length is between 20 carbon atoms and 2000 carbon atoms long.

g. At least 50% of all unsaturated chain ends are vinyl chain ends, preferably 60% or more, more preferably 70% or more, even more preferably 80% or more, or even 90% or more.

h. The branching index $g'_{vis}$ is 0.98 or less, preferably 0.95 or less.

i. The olefin oligomer is in liquid phase at 25° C. and soluble to aliphatic and aromatic solvents at room temperature.

j. The olefin oligomer is amorphous, having no detectable melting peak from DSC measurement and having a heat of fusion 5 J/g or less.

Preferably, the olefin oligomer has at least 50% vinyl chain ends, on the basis of all unsaturated chain ends in the olefin oligomer. Such oligomers may be referred to herein as "vinyl terminated" oligomers.

The composition of the olefin oligomer exhibiting one or more of the aforementioned properties may vary among different embodiments. In general, the olefin oligomer may be a homo-oligomer or co-oligomer (i.e., comprised of 2 or more monomeric units) comprising one or more C2 to C40 olefin-derived units (e.g., C2 to C30, C2 to C20, or C2 to C12, e.g., butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof). Preferably, the C2 to C40 olefin units are each alpha-olefins. C2 to C20 alpha-olefin-derived units are preferred, with C2 to C12 alpha-olefin-derived units particularly preferred in many embodiments.

The olefin oligomers of certain embodiments are ethylene homo-oligomers or co-oligomers (e.g., comprising units derived from ethylene and one or more C3 to C12 alpha-olefins). Ethylene co-oligomers may comprise 1 mol % to 99.9 mol % of the one or more C3 to C12 alpha-olefin-derived units, and the balance ethylene-derived units.

In particular embodiments, the C3-C12 alpha-olefin is propylene, such that the olefin oligomer is an ethylene-propylene co-oligomer. Ethylene-derived units may be present in such an olefin oligomer within the range of 5 mol % to 95 mol %, and propylene-derived units may likewise be present within the range of 5 mol % to 95 mol %. Furthermore, the Mn of such ethylene-propylene co-oligomers is preferably within the range of 200 to 30,000 g/mol (measured by 1H NMR).

In yet other embodiments, the ethylene co-oligomer comprises units derived from ethylene and from one or more C5 to C40 alpha-olefins. The ethylene co-oligomer of such embodiments, comprising larger co-monomeric units, may in some instances have only 30% or more vinyl terminations, relative to all unsaturated chain ends (as opposed to the above-recited 50% minimum generally adhered to for olefin oligomers of various other embodiments).

Alternatively, the olefin oligomer may be a propylene homo-oligomer. Amorphous propylene homo-oligomers are preferred. In yet other embodiments, the olefin oligomer may be a propylene co-oligomer (e.g., comprising units derived from propylene and one or more C2 and/or C4-C20 alpha-olefins). Propylene is present in such propylene co-oligomers in amounts ranging from 50 mol % to 99.99 mol %, with the one or more C4-C20 alpha-olefins constituting the balance (i.e., 0.1 mol % to 50 mol %).

In yet further embodiments, the olefin oligomer may be a butylene co-oligomer comprising from 80 mol % to 99.9 mol % of units derived from at least one C4 olefin and from 0.1 mol % to 20 mol % of propylene-derived units. Co-oligomers according to these embodiments may have at least 40% vinyl chain ends, relative to total unsaturated chain ends of the oligomer.

Oligomers useful herein may be produced by processes known in the art to make vinyl terminated oligomers or polymers, including solution process with a homogeneous catalyst system and a gas phase process with a supported catalyst.

For instance, in some embodiments, a phenoxyimine-based catalyst (a Mitsui FI catalyst) or a pyrroleimine-based catalyst (a Mitsui PI catalyst) can be used to prepare a vinyl terminated ethylene oligomer. These catalysts comprise (a) a transition metal (preferably Ti or transition metals of Groups 3-11 in the periodic table) compound having phenoxyimine or pyrroleimine as a ligand, and (b) one or more kind(s) of compound selected from (b-1) an organic metal compound, (b-2) an organic aluminum oxy compound, and (b-3) a compound that reacts with the transition metal compound (a) to form an ion pair, as described in Japanese Patent Publication Nos. JP-A-2001-72706, JP-A-2002-332312, JP-A-2003-313247, JP-A-2004-107486, and JP-A-2004-107563. Preferred catalysts to prepare the vinyl terminated ethylene oligomer include those described in U.S. Pat. No. 7,795,347, incorporated herein by reference.

Ethylene Copolymers

As used herein the terms "ethylene copolymer", "ethylene elastomers" are intended to mean ethylene and alpha-olefin or ethylene, alpha-olefin and diene copolymers.

In one embodiment, the oil extended ethylene copolymer comprises ethylene, an alpha-olefin, and incorporated olefin oligomers. Optionally, the oil extended ethylene copolymer further comprises one or more diene-derived units.

The alpha-olefin in the oil extended ethylene alpha-olefin or ethylene alpha-olefin and diene copolymers can be selected from $C_3$ to $C_{40}$ alpha-olefins. Preferably the alpha-olefins have 3 to 12 carbon atoms such as propylene, 1-butene, 1-pentene, 3-methyl-1-butene, 1-hexene, 3-methyl-1-pentene, 4-methyl-1-pentene, 3-ethyl-1-pentene, 1-octene, 1-decene, 1-undecene (two or more of which may be employed in combination). Among those listed above, propylene is more preferred. Preferably, the copolymer produced herein is a copolymer of ethylene, propylene, and oligomers or a copolymer of ethylene, propylene, diene and oligomers.

In another embodiment, the ethylene copolymer produced herein is a copolymer of 1) ethylene; 2) up to 70 mol % (preferably from 30 mol % to 80 mol %, preferably from 40 mol % to 70 mol %) of one or more $C_3$ to $C_{40}$ (preferably $C_3$ to $C_{20}$, preferably $C_3$ to $C_{12}$) olefins, preferably alpha-olefins (preferably propylene, 1-butene, 1-hexene, and 1-octene); and 3) oligomers (preferably present at 30 mol %, or less, more preferably 20 mol % or less, even more preferably 15 mol % or less).

In one embodiment, the oil extended ethylene alpha-olefin or ethylene alpha-olefin and diene copolymers can be copolymerized with at least one diene monomer to create cross-linkable copolymers. Suitable diene monomers include any hydrocarbon structure, preferably $C_4$ to $C_{30}$, having at least two unsaturated bonds. Preferably the diene is a non-conjugated diene with at least two unsaturated bonds, wherein one of the unsaturated bonds is readily incorporated into a polymer. The second bond may partially take part in polymerization to form cross-linked polymers but normally provides at least some unsaturated bonds in the polymer product suitable for subsequent functionalization (such as with maleic acid or maleic anhydride), curing or vulcanization in post polymerization processes. Examples of dienes include, but are not limited to butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight ($M_w$) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; methyl-tetrahydroindene; dicyclopentadiene; bicyclo-(2.2.1)-hepta-2,5-diene; 2,5-norbornadiene; and alkenyl-, alkylidene-, cycloalkenyl-, and cylcoalkyliene norbornenes [including, e.g., 5-methylene-2-norbornene, 5-ethylidene-2-norbornene (ENB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. 5-ethylidene-2-norbornene (ENB) is a preferred diene in particular embodiments.

Diene monomers as utilized in some embodiments have at least two polymerizable unsaturated bonds that can readily be incorporated into polymers to form cross-linked polymers in a polymerization reactor. A polymerizable bond of a diene is referred as to a bond which can be incorporated or inserted into a polymer chain during the polymerization process of a growing chain. Diene incorporation is often catalyst specific. For polymerization using metallocene catalysts, examples of such dienes include α,ω-dienes (such as butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene) and certain multi-ring alicyclic fused and bridged ring dienes (such as tetrahydroindene; 7-oxanorbornadiene, dicyclopentadiene; bicyclo-(2.2.1)-hepta-2,5-diene; 5-vinyl-2-norbornene; 3,7-dimethyl-1,7-octadiene; 1,4-cyclohexadiene; 1,5-cyclooctadiene; 1,7-cyclododecadiene and vinyl cyclohexene). In one embodiment of polymer compositions (and/or processes for making them), the content of diene with at least two polymerizable bonds in the inventive polymer composition is less than 0.5 wt %, preferably less than 0.1 wt % of the copolymer.

In yet further embodiments, the ethylene copolymer compositions may also or instead be characterized by their composition. In some general embodiments, the polymer compositions may be said to comprise units derived from one or more, two or more, or three or more $C_2$-$C_{40}$ alpha-olefins (or $C_2$-$C_{20}$ alpha-olefins, or $C_2$-$C_{12}$ alpha-olefins), and optionally one or more dienes. For instance, the polymer compositions may comprise units derived from ethylene, one or more $C_3$-$C_{12}$ alpha-olefins, and optionally one or more dienes.

In embodiments where an ethylene copolymer may be characterized as having ethylene content in an amount ranging from about 20 to about 80 (or alternatively, e.g., from any one of about 20, 25, 30, 35, and 40, to any one of about 45, 50, 55, 60, 65, 70, 75, and 80) wt %, on the basis of the total weight of copolymers in the copolymer composition. When such compositions further include dienes, they may be present in amounts ranging from about 0.3 to about 15 (or alternatively, e.g., from any one of about 0.3, 0.5, 0.7, and 1 to any one of about 2, 3, 4, 5, 6, 7, 8, 9, 10, 11, 12, 13, 14, and 15) wt %, on the basis of the total weight of copolymers in the copolymer composition.

The ethylene copolymers in some embodiments comprises one or more ethylene copolymers (a blend of two or more ethylene copolymers), each ethylene copolymer comprising units derived from two or more different $C_2$-$C_{12}$ alpha-olefins, oligomers and, optionally, one or more dienes.

Such ethylene copolymer compositions may further be characterized as comprising one or more copolymers, each copolymer having units derived from ethylene in an amount ranging from about 20 to about 80 (or, alternatively, from any one of about 20, 25, 30, 35, and 40, to any one of about 45, 50, 55, 60, 65, 70, 75, and 80) wt %, on the basis of the total weight of the copolymer. When such a copolymer includes dienes, the dienes may be present in amounts ranging from about 0.3 to about 15 (or e.g., from any one of about 0.3, 0.5, 0.7, and 1 to any one of about 2, 3, 4, 5, 6, 7, 8, 9, 10, 11, 12, 13, 14, and 15) wt %, based on the total weight of the copolymer. The fraction of each ethylene copolymer can be determined using fractionation techniques as known by one of skill in the art.

In one embodiment, the oil extended ethylene alpha-olefin or ethylene alpha-olefin and diene copolymers can be copolymerized with oligomers described earlier to create branched ethylene copolymers.

Introduction of oligomers into oil extended ethylene alpha-olefin or ethylene alpha-olefin and diene copolymers is achieved by a copolymerization of ethylene, alpha-olefin and oligomers. The composition of vinyl terminated oligomers can be different from that in the ethylene copolymer backbone. The oil extended ethylene and alpha-olefin or ethylene alpha-olefin and diene copolymers can be homogenous or heterogeneous in composition. For example, the copolymer comprises ethylene and propylene when propylene oligomers are copolymerized with ethylene/propylene copolymer. This results in a copolymer with ethylene/propylene backbone and propylene side chains (i.e., polypropylene chain segment). Likewise, a copolymer with ethylene/propylene backbone and ethylene/propylene side chains can form when a vinyl terminated ethylene/propylene oligomers are used in the polymerization. In one embodiment, the ethylene copolymer comprises the same composition in the backbone as that in the side chains. In another embodiment, the composition on the backbone is different from that in the side chains. More preferably, the side chains comprise propylene, preferably greater than 50 mol % propylene.

The number of branches and level of branches depend on the amount of oligomer incorporated. One branch will typically be created by every oligomer incorporated. The number of branches can be determined using $^{13}C$ NMR. In one embodiment, the ethylene content is 30 wt % or more, preferably 40 wt % or more, even more preferably 50 wt % or more. In another embodiment, the oligomer content (defined as the amount of oligomers incorporated on ethylene copolymer) is 20 mol % or less, preferably 15 mol % or less and more preferably 10 mol % or less. Preferably the oligomer content is from 1 to 20 mol %, preferably from 1 to 10 mol %, preferably from 1 to 5 mol %, the mol % is based upon the total molar composition of the ethylene copolymer. Number average molecular weight measured by $^1H$ NMR is used to calculate molar concentration of oligomers.

The length of branches and its distribution depend on the molecular weight distribution of oligomers used. In one embodiment, the number averaged branch length is less than 400 carbon atoms long, preferably less than 350 carbon atoms long, more preferably less than 300 carbon atoms long. One of advantages of the inventive material is its ability to adjust the chain length according to the needs of end uses. For example, short branches significantly interfere with the formation of crystal structures, while long chain branches have profound effects on rheology properties in molten state.

Where an olefin oligomer is incorporated into an ethylene copolymer, preferably the oligomer is in accordance with the above-described embodiments wherein the oligomer is amorphous (i.e., having with no detectable melting peak from DSC measurement and having a heat of fusion 5 J/g or less). Preferably the amorphous branches are amorphous polypropylene. Preferably, the molecular weight (measured by $^1H$ NMR) of the amorphous propylene oligomer is 10,000 g/mol or less, preferably 8,000 g/mol or less, more preferably 5,000 g/mol or less.

In another embodiment, the olefin oligomers are branched so the oil extended ethylene alpha-olefin or ethylene alpha-olefin and diene copolymers has a hyper-branched (branch on branch) structure.

The level of oligomer incorporated in the oil extended ethylene alpha-olefin or ethylene alpha-olefin and diene copolymers can be detected using GPC-3D as described in the experimental section below. A branching index $g'_{vis}$ is used to measure the level of branching. In one embodiment, the oil extended ethylene alpha-olefin or ethylene alpha-olefin and diene copolymers has a $g'_{vis}$ of less than 0.95, preferably 0.90 or less, more preferably 0.85 or less. The $g'_{vis}$ is calculated using the intrinsic viscosity of linear homo-polyethylene according to the procedure described in the Experimental section. Branching structures of the oil extended ethylene alpha-olefin or ethylene, alpha-olefin and diene copolymer also have smaller radius of gyration as compared with that of a linear homo-polyethylene of the same molecular weight. Radius gyration can be determined by using GPC with multiple angle light scattering detectors. In one embodiment, the ratio of radius gyration of the oil extended ethylene alpha-olefin or ethylene, alpha-olefin and diene copolymer to the radius gyration of ethylene homopolymer at the same molecular weight (the "g value") is of 0.9 or less, preferably 0.8 or less, more preferably 0.7 or less. See Macromolecules, 2001, 34, 6812-6820, for guidance on selecting a linear standard having the same molecular weight and comonomer content, and determining the g-values.

The oil extended ethylene alpha-olefin or ethylene alpha-olefin and diene copolymers have rheological characteristics of long chain branched EPDM. Branched structures through incorporation of oligomers can also be observed by Small Amplitude Oscillatory Shear (SAOS) measurement of the molten polymer performed on a dynamic (oscillatory) rotational rheometer. From the data generated by such a test it is possible to determine the phase or loss angle $\delta$, which is the inverse tangent of the ratio of G" (the loss modulus) to G' (the storage modulus). For a typical linear polymer, the loss angle at low frequencies approaches 90°, because the chains can relax in the melt, absorbing energy, and making the loss modulus much larger than the storage modulus. As frequencies increase, more of the chains relax too slowly to absorb energy during the oscillations, and the storage modulus grows relative to the loss modulus. Eventually, the storage and loss moduli become equal and the loss angle reaches 45°. In contrast, a branched chain polymer relaxes very slowly, because the branches need to retract first before the chain backbone can relax along its tube in the melt. This polymer never reaches a state where all its chains can relax during an oscillation, and the loss angle never reaches 90° even at the lowest frequency, $\omega$, of the experiments. The loss angle is also relatively independent of the frequency of the oscillations in the SAOS experiment; another indication that the chains cannot relax on these timescales. In one embodiment, the phase angle of the oil extended ethylene copolymer is 45° or less, preferably 40° or less, more preferably 35° or less. Alternatively the tan ($\delta$) of oil extended ethylene copolymer is 1 or less, 0.8 or less, 0.7 or less.

As known by one of skill in the art, rheological data may be presented by plotting the phase angle versus the absolute value of the complex shear modulus (G*) to produce a van Gurp-Palmen plot. The plot of conventional linear polyethylene polymers shows monotonic behavior and a negative slope toward higher G* values. Conventional EPDM copolymer without long chain branches exhibit a negative slope on the van Gurp-Palmen plot. For oil extended ethylene alpha-olefin or ethylene alpha-olefin and diene copolymers, the phase angels shift to a lower value as compared with the phase angle of a conventional ethylene polymer without long chain branches at the same value of G*. In one embodiment, the phase angle of the inventive oil extended ethylene copolymers is less than 45 degree in a range of the complex shear modulus from 50,000 Pa to 1,000,000 Pa.

The oil extended ethylene alpha-olefin or ethylene alpha-olefin and diene copolymers of this invention preferably have significant shear induced viscosity thinning Shear thinning is characterized by the decrease of the complex viscosity with increasing shear rate (or frequency). One way to quantify the shear thinning is to use a ratio of complex viscosity at a frequency of 0.1 rad/s to the complex viscosity at a frequency of 100 rad/s. Preferably, the complex viscosity ratio of the oil extended ethylene alpha-olefin or ethylene alpha-olefin and diene copolymers is 50 or more, more preferably 75 or more, even more preferably 100 or more when the complex viscosity is measured at a temperature of 190° C.

The oil extended ethylene and alpha-olefin or ethylene, alpha-olefin and diene copolymers preferably has an Mw of 10,000 to 2,000,000 g/mol, preferably 20,000 to 1,000,000 g/mol, more preferably 30,000 to 500,000 g/mol, more preferably 100,000 g/mol or more, as measured by size exclusion chromatography, as described below in the Experimental section below, and/or an Mw/Mn of 2 to 100, preferably 2.5 to 80, more preferably 3 to 60, more preferably 3 to 50 as measured by size exclusion chromatography, and/or a Mz/Mw of 2 to 50, preferably 2.5 to 30, more preferably 3 to 20, more preferably 3 to 25. The Mw referred to herein, and for purposes of the claims attached hereto, is obtained from GPC using a light scattering detector as described in the Experimental section below.

In any embodiment of the invention described herein the oil extended ethylene and alpha-olefin or ethylene, alpha-olefin and diene copolymers may have a complex viscosity at 0.1 rad/sec and a temperature of 190° C. of at least 100,000 Pa·sec (preferably at least 200,000 Pa·sec, preferably from 50,000 to 1,000,000 Pa·sec, preferably from 100,000 to 1,000,000 Pa·sec).

The oil extended ethylene and alpha-olefin or ethylene, alpha-olefin and diene copolymers may have Mooney viscosity ML (1+4 at 125° C.) ranging from a low of any one of about 20, 30, 40, 50 and 60 MU (Mooney units) to a high of any one of about 70, 80, 90, 100, 110, 120, 130, 140, 150, 160, 170, and 180 MU. Mooney viscosity in terms of MST (5+4 at 200° C.) may range from a low of any one of about 10, 20, and 30 MU to a high of any one of about 40, 50, 60, 70 80, 90, and 100 MU.

The oil extended ethylene and alpha-olefin or ethylene, alpha-olefin and diene copolymers may have MLRA ranging from a low of any one of about 100, 200, 300, 350, and 400 mu*sec to a high of any one of about 500, 550, 600, 650, 700, 800, 900, 1000, 1150, 1200, 1250, 1300, 1350, 1400, 1450, 1500, 1550, 1600, 1650, 1700, 1750, 1800, 1850, 1900, 1950, and 2000 mu*sec. For instance, MLRA may be within the range of about 300 to about 2000 mu*sec, or from about 400 to about 1500 mu*sec, or from about 500 to about 1200 mu*sec, etc. In certain embodiments, MLRA may be at least 500 mu*sec, or at least 600 mu*sec, or at least 700 mu*sec.

Alternatively, the oil extended ethylene and alpha-olefin or ethylene, alpha-olefin and diene copolymers may have cMLRA at Mooney Large Viscosity ML=80 mu (Mooney units) ranging from a low of any one of about 200, 250, 300, 350, and 400 mu*sec to a high of any one of about 500, 550, 600, 650, 700, 800, 900, 1000, 1150, 1200, 1250, 1300, 1350, 1400, 1450, 1500, 1550, 1600, 1650, 1700, 1750, 1800, 1850, 1900, 1950, and 2000 mu*sec. For instance, cMLRA may be within the range of about 240 to about 2000 mu*sec, or from about 400 to about 1500 mu*sec, or from about 500 to about 1200 mu*sec, etc. In certain embodiments, cMLRA may be at least 500 mu*sec (without a necessary upper boundary), or at least 600 mu*sec, or at least 700 mu*sec.

The oil extended ethylene alpha-olefin or ethylene alpha-olefin and diene copolymer in some embodiments has a bimodal distribution in composition distribution along molecular weight. In one embodiment, the ethylene content is higher at the lower molecular weight side than that at the higher molecular weight side. The difference is of 5 wt % or more, preferably 10 wt % or more. Distribution in ethylene composition may be determined using GPC-IR technique as described in the Test Methods section below regarding Molecular Weight and Composition Distribution. In another embodiment, the ethylene content is lower at the lower molecular weight side than that at the higher molecular weight side. The difference is of 5 wt % or more, preferably 10 wt % or more.

Yet further embodiments provide an ethylene polymer composition that may be characterized as a reactor blend of two or more of the following: oligomer oil; a first low molecular weight ethylene copolymer and a second high molecular weight ethylene copolymer. The first copolymer having units derived from ethylene, a $C_3$-$C_{12}$ α-olefin, and optionally one or more dienes; and the second copolymer having units derived from ethylene, a $C_3$-$C_{12}$ α-olefin, and optionally one or more dienes. The first copolymer may have ethylene content within the range of about 20 wt % to about 80 wt %, and the second copolymer may have ethylene content within the range of about 30 wt % to about 80 wt %, wherein the second copolymer has at least 5 wt % greater ethylene content than the first copolymer. In such embodiments, the ratio of Mw of the second copolymer to Mw of the first copolymer is at least any one of about 1.5, 2, 3, 4, or 5.

In another embodiment, the ethylene content in the first and the second ethylene copolymer are different. The difference is at least 5 wt %, preferably 10 wt %. Alternatively, the ethylene content of the first ethylene copolymer is higher than the ethylene content of the second copolymer by at least of 5 wt %. The ethylene distribution of the inventive ethylene copolymer can be determined according to the description of Molecular Weight and Composition Distribution in the Test Methods section below. Ethylene content in each portion of the blend (e.g., in each of the first and second copolymers) can be controlled according to polymerization processes of various embodiments. For instance, two or more catalyst systems may be used to create the reactor blend, and the catalysts may be selected such that they produce polymers having different ethylene content. Alternatively or in addition, ethylene content in each fraction of the blend can be controlled through monomer concentration according to each catalyst's kinetic response of ethylene insertion rate. Or, in a process involving two or more polymerization zones, ethylene monomer feed to each zone may be varied to accomplish the differential in ethylene content among the fractions of the blend. The catalyst used for oil oligomer production can be also used to produce ethylene copolymer in a separated polymerization zone.

In one aspect, both of the first and second ethylene copolymers are amorphous. Alternatively one of the ethylene copolymer is amorphous and another one has low crystallinity Furthermore, the molecular weight may be different between the first and second ethylene copolymer. In one embodiment, first ethylene copolymer has a weight averaged molecule weight (Mw) of 50,000 g/mol or less, and the second ethylene copolymer has an Mw of 100,000 or more. In one aspect of this invention, the Mw ratio of the second ethylene copolymer to the first ethylene copolymer is 1.5 or more, preferably 2.0 or more, more preferably 2.5 or more.

The amount of first ethylene copolymer relative to the in-reactor blend may vary widely depending on the nature of the polymers and the intended use of the final polymer blend. In particular, however, one advantage of the process of the invention is the ability to be able to produce a reactor polymer blend in which the first ethylene copolymer comprise more than 30 wt %, such as more than 40 wt % of the total reactor blend. The ratio of the two copolymers in the blend can be manipulated according to processes for producing such blends according to various embodiments. For instance, where two catalysts are used for producing the blend, the concentration ratio of the two catalysts can result in different amounts of the first and second ethylene copolymers of the blend. Preferably the ethylene copolymer having lower molecular weight is of 50 or less, more preferably 40 or less, 30 or less and 20 or less wt % of the total blend. Catalyst concentration in each of one or more polymerization zones can be adjusted through catalyst feed rate to the reactor. In one embodiment, the molar ratio of the first catalyst feed rate to the second catalyst feed rate is in a range of 0.05 to 20. The fraction of each ethylene copolymer can be determined using fraction techniques known by one of skill in the art.

In addition or instead, the polymer composition may be characterized as a reactor blend comprising two ethylene copolymers (a first and a second ethylene copolymer). Preferably, the first ethylene copolymer has a Mooney viscosity (1+4 at 125° C.) of 10 mu or less and the second ethylene copolymer has a Mooney viscosity (1+4 at 125° C.) of 20 mu or more. The reactor blend has a phase angle of 50 degree or less when measured at complex shear modulus G*=100,000 Pa and a temperature of 190° C. and has an overall Mooney viscosity of at least 40 mu (1+4@125° C.). Alternatively the final product has a tan δ of 1.2 or less (preferably 1.0 or less, more preferably 0.8 or less) measured at a frequency of 10 rad/sec and a temperature of 190° C.

Without being bound by theory, it is believed that the various different compositions as characterized according to these embodiments may result at least in part due to different levels of incorporation of oligomers into the ethylene and alpha-olefin or ethylene, alpha-olefin and diene copolymers formed by polymerization processes according to various embodiments. For instance, where all or substantially all of the oligomer is incorporated into the ethylene and alpha-olefin or ethylene, alpha-olefin and diene copolymers, the polymer composition may be said to comprise less free oligomer oil. Oil surface blooming might be improved or eliminated since the oil is chemically bond to the ethylene copolymer chain. Where the incorporation is incomplete, the composition may further comprise more oligomer oil. The level of oligomer incorporated can be control through the concentration ratio of oligomer to other monomers. The amount of free oligomer oil can be determined using solvent extraction technique. In one embodiment, the amount of free oil is at least 5 phr, preferably at least 10 phr. In another embodiment, the amount of free oil is in a range from 5 to 150 phr, preferably from 10 to 120 phr.

Polymerization Processes

This invention in further embodiments also relates to a polymerization process to produce oil extended ethylene alpha-olefin or ethylene alpha-olefin and diene copolymers described earlier. The oil comprises olefin oligomers as described above, and is produced in-situ in the same polymerization process. In one aspect, the oligomers are also incorporated into an ethylene alpha-olefin or ethylene, alpha-olefin and diene copolymer chains to form side arms (also referred as to branches), also as noted previously. The process in some embodiments comprises:

a. contacting at propylene and, optionally, one or more additional alpha-olefins with a first catalyst, forming olefin oligomers having at least 50% of vinyl chain end relative to all unsaturated chain ends (also referred to as a "vinyl terminated oligomer"); and
 b. contacting at least a portion of said olefin oligomers with ethylene and, optionally, one or more additional alpha-olefins with a second catalyst, forming ethylene and alpha-olefin or ethylene, alpha-olefin and diene copolymers.

In one aspect, the olefin oligomer is produced in a first reactor using the first catalyst. At least part of the olefin oligomer is then transferred into a second reactor where the ethylene and alpha-olefin or ethylene, alpha-olefin and diene copolymer is produced using the second catalyst. The final product of the oil extended ethylene copolymer is produced in the second reactor. The un-reacted olefin oligomer acts as an extruder oil, and is well mixed with the ethylene copolymer produced in the second reactor. And, in some embodiments, the copolymer produced in the second reactor also incorporates a portion of the olefin oligomer. Production of high vinyl chain end oil in the separate first reactor according to these embodiments allows maximizing the formation of branching structure during the ethylene copolymer polymerization in the second reactor.

As noted, the copolymer may incorporate a portion of the olefin oligomer. In polymerization systems, oligomers with reactive polymerizable double bonds can be incorporated into growing polymer chains in a similar manner as the comonomer (e.g., 1-butene, 1-hexene, 1-octene) incorporation during the reaction of polymerization. Amount of oligomer incorporation often depends on the concentration of the oligomer relative to the concentration of ethylene or other olefins. Selection of catalyst and process conditions is also useful to influence the incorporation of oligomers.

In one embodiment, both the oligomers and ethylene alpha-olefin or ethylene, alpha-olefin and diene copolymers may be produced in a single polymerization process with at least two reactors (e.g., the aforementioned first and second reactors) in series configuration. The oligomers may be produced in first reaction zone with a polymerization catalyst capable of producing vinyl terminated oligomers. At least part of the contents of the first reaction zone are then transferred into a separate second reaction zone together with ethylene and with additional monomers selected from $C_3$ to $C_{12}$ alpha-olefins or mixtures thereof so as to produce branched ethylene and alpha-olefin or ethylene, alpha-olefin and diene copolymers in the presence of oligomer produced. The branched structures are derived from oligomer reinsertion into the backbone of ethylene copolymers. A "reaction zone," also referred to as a "polymerization zone," is a vessel where polymerization takes place, e.g., a batch reactor or a continuous reactor. When multiple reactors are used in either series or parallel configuration, each reactor is considered as a separate polymerization zone. For a multistage polymerization in both a batch reactor and a continuous reactor, each polymerization stage is considered as a separate polymerization zone.

In one embodiment, the oligomers may be produced in first reaction zone with a polymerization catalyst capable of producing vinyl terminated oligomers. At least part of the contents of the first reaction zone are then transferred into a separate second reaction zone together with ethylene, alpha-olefin and additional diene or a mixtures of diene so as to produce branched ethylene, alpha-olefin and diene copolymers in the presence of oligomer produced. Various types of diene can be used in this inventive process. Example of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododadiene. Examples of multi-ring alicyclic fused and bridged ring dienes include, but are not limited to tetrahydroindene; methyl-tetrahydroindene; dicyclopentadiene; bicyclo-(2.2.1)-hepta-2,5-diene; 2,5-norbornadiene; and alkenyl-, alkylidene-, cycloalkenyl-, and cylcoalkyliene norbornenes [including, e.g., 5-methylene-2-norbornene, 5-ethylidene-2-norbornene (ENB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. 5-ethylidene-2-norbornene (ENB) is a preferred diene in particular embodiments. Ethylene, propylene and ENB copolymer are a preferred ethylene copolymers for use in the invention.

In one embodiment, the second reaction zone employs the same catalyst system transferred from the first reaction zone, with no additional catalyst being supplied to the second reaction zone. Alternatively, an additional amount of the same catalyst system, as used in the first reaction zone, is fed into the second reaction. Generally between 10% and 90%, such as between 20% and 80%, for example between 30% and 70% of the total catalyst is supplied to the first reaction zone, with the remainder being supplied to the second reaction zone. The molar ratio of the catalyst supplied to the first reaction zone to the catalyst supplied to the second reaction zone depends on the end-use requirements of the ethylene, alpha-olefin or ethylene, alpha-olefin and diene copolymers.

In another embodiment, a second catalyst capable of incorporating oligomers is used in the second reaction zone. The second catalyst is generally different from the first catalyst system used for oligomer production in the first reaction. The molar ratio of the first polymerization catalyst to the second polymerization catalyst is generally from 5:95 to 95:5 depending on the application and other process variables.

Processes according to more particular embodiments comprise:

(i) polymerizing propylene in a first polymerization zone under conditions sufficient to produce a propylene oligomer comprising at least 50% vinyl chain ends, based on the total unsaturated olefin chain ends; and (ii) contacting at least part of said propylene oligomer with ethylene, propylene and optional diene monomer in a second polymerization zone separated from said first polymerization zone under conditions sufficient to polymerize said monomers and oligomers to produce oil extended ethylene alpha-olefin or ethylene alpha-olefin and diene copolymers. In some embodiments, a portion of the propylene oligomer forms at least part of an in situ extender oil. In certain embodiments, a further portion of the propylene oligomer is incorporated into the ethylene alpha-olefin or ethylene alpha-olefin and diene copolymers.

As described above, the contents of the first reactor zone are transferred to the second reactor zone, and become a part of the reaction medium in the second reactor zone. The catalyst system employed in the first reactor zone may still be (and preferably is) active to continue the polymerization reaction in the second reactor zone. An ethylene copolymer (or polymer composition comprising a blend of ethylene copolymers) can be produced in the second reactor. Alternatively, a part or all of the solvent and unreacted monomers are removed from the polymerization effluent in the first reactor zone, and the oligomer, and remaining solvent and monomers are transferred into the second reactor zone. This can be implemented in a system with two reactors in series and a primary separator in between the two reactors. This process scheme also allows independent control of polymerization temperature in the first and second polymerization zones.

To minimize the effects of unreacted monomer on the ethylene/oligomer copolymer produced in the second reactor zone, the monomer conversion in the first reactor is preferably high. Preferably, the monomer conversion in the first reactor is at least 50 wt %, more preferably at least 70 wt %.

It is to be appreciated that, although the foregoing discussion refers only to first and second polymerization zones, further reaction zones could be employed, with the feed to the second reaction zone being split between the additional reaction zones.

In another embodiment, pre-made oligomer oils are used to produce the oil extended ethylene alpha-olefin or ethylene alpha-olefin and diene copolymers. The pre-made oligomers are fed into a polymerization reactor in the presence of ethylene and at least a catalyst capable of incorporating the oligomers. The oligomers can be fed into a reactor in forms of liquid, granular particles or dissolved or diluted in a carrying solvent. When the oligomer is in the solid state at ambient condition, preferably, the oligomers are first dissolved in a carrying solvent and fed into a reactor as an oligomer solution.

In one embodiment, the vinyl terminated oligomers described here may be used in combination with one or more monomers having from 3 to 40 carbon atoms, preferably from $C_3$ to $C_{10}$, more preferably $C_3$ to $C_8$. Preferred monomers include propylene, 1-butene, 1-pentene, 4-methyl-1-pentene, 1-hexene, 1-octene, 1-decene, 3-methyl-1-pentene, and cyclic olefins or a combination thereof.

In another embodiment, a process is disclosed to produce a blend of (i) low molecular weight oligomer and (ii) high Mooney viscosity ethylene copolymer, comprising contacting a first metallocene catalyst system with ethylene, propylene and diene monomers thereby producing the low molecular weight oligomer; contacting a second metallocene catalyst system (different from the first catalyst system) with ethylene, propylene and diene monomers to produce a second polymer component; and controlling conditions in each reactor in order to obtain an olefin oligomer having a Brookfield viscosity of less than 50,000 mPa (measured at a temperature of 60° C.) and a second polymer component having a Mooney viscosity of 60 mu or more (1+4@125° C.), where the final blend product has a phase angle of 50 degree or less when measured at complex shear modulus G*=100,000 Pa and a temperature of 190° C. and an overall Mooney viscosity of at least 40 mu (1+4@125° C.). Alternatively the final product has a tan δ of 1.2 or less measured at a frequency of 10 rad/sec and a temperature of 190° C.

Catalyst System for Production of Oligomers and Ethylene Copolymers

Suitable catalysts (e.g., for producing the oil extended ethylene alpha-olefin elastomer or ethylene-alpha-olefin, diene copolymer) are those capable of polymerizing a $C_2$ to $C_{20}$ olefin and oligomers. These include both metallocene and Ziegler-Natta catalysts. In some embodiments, the catalyst system includes a catalyst compound and an activator, as well as an optional support and/or optional co-activators, in particular embodiments. The catalyst compound may be a metallocene capable of incorporating vinyl-terminated oligomer chains into a polymer, and further capable of producing high molecular weight ethylene copolymer. In some embodiment, the catalysts employed in the first reaction zone include those capable of producing oligomers with reactive unsaturated chain ends, preferably at least 50% of vinyl unsaturation based on the total unsaturated olefin chain ends, while the catalyst used in the second reaction zone include those capable of incorporating the polymerizable oligomer into a growing chain to form branched ethylene copolymers with side arms.

A polymerization catalyst system is a catalyst system that can polymerize monomers to polymer. A "catalyst system" is a combination of at least one catalyst compound, at least one activator, an optional co-activator, and an optional support material. An "anionic ligand" is a negatively charged ligand which donates one or more pairs of electrons to a metal ion. A "neutral donor ligand" is a neutrally charged ligand which donates one or more pairs of electrons to a metal ion.

For the purposes of this invention and the claims thereto, when catalyst systems are described as comprising neutral stable forms of the components, it is well understood by one of ordinary skill in the art, that the ionic form of the component is the form that reacts with the monomers to produce polymers.

A metallocene catalyst is defined as an organometallic compound with at least one π-bound cyclopentadienyl moiety (or substituted cyclopentadienyl moiety) and more frequently two π-bound cyclopentadienyl-moieties or substituted moieties. This includes other π-bound moieties such as indenyls or fluorenyls or derivatives thereof. The term "substituted" means that a hydrogen group has been replaced with a hydrocarbyl group, a heteroatom, or a heteroatom containing group. For example, methyl cyclopentadiene (Cp) is a Cp group substituted with a methyl group, ethyl alcohol is an ethyl group substituted with an —OH group, and a "substituted hydrocarbyl" is a radical made of carbon and hydrogen where at least one hydrogen is replaced by a heteroatom.

Suitable catalyst compounds for producing the oil extended ethylene alpha-olefin elastomer or ethylene-alpha-olefin, diene copolymer include, for example, mono-Cp amido group 4 complexes, bridged fluorenyl-cyclopentadienyl group 4 complexes, biphenyl phenol (BPP) transition metal complexes, pyridyl amide transition metal complexes and/or pyridyl diamide transition metal complexes. The detailed structures of these catalysts were described in 2015EM009 as HMP catalysts, incorporated by reference in its entirety.

Particular examples of some suitable mono-Cp amido group 4 catalyst compounds include: dimethylsilylene(tetramethylcyclopentadienyl)(cyclododecylamido)titanium dimethyl; dimethylsilylene(tetramethylcyclopentadienyl) (tert-butylamido)titanium dimethyl;
dimethylsilylene(tetramethylcyclopentadienyl)(adamantylamido)titanium dimethyl;
dimethylsilylene(tetramethylcyclopentadienyl)(cyclooctylamido)titanium dimethyl;
dimethylsilylene(tetramethylcyclopentadienyl)(cyclohexylamido)titanium dimethyl;
dimethylsilylene(tetramethylcyclopentadienyl)(norbornylamido)titanium dimethyl
dimethylsilylene(trimethylcyclopentadienyl)(cyclododecylamido)titanium dimethyl;
dimethylsilylene(trimethylcyclopentadienyl)(adamantylamido)titanium dimethyl;
dimethylsilylene(trimethylcyclopentadienyl)(tert-butylamido)titanium dimethyl;
dimethylsilylene(6-methyl-1,2,3,5-tetrahydro-s-indacen-5-yl)(tert-butylamido)titanium dimethyl; dimethylsilylene(6-methyl-1,2,3,5-tetrahydro-s-indacen-5-yl)(adamantylamido)titanium dimethyl; dimethylsilylene(6-methyl-1,2,3,5-tetrahydro-s-indacen-5-yl)(cyclooctylamido) titanium dimethyl; dimethylsilylene(6-methyl-1,2,3,5-tetrahydro-s-indacen-5-yl)(cyclohexylamido)titanium dimethyl; dimethylsilylene(6-methyl-1,2,3,5-tetrahydro-s-indacen-5-yl)(cyclododecylamido)titanium dimethyl;
dimethylsilylene(2,2,6-trimethyl-1,2,3,5-tetrahydro-s-indacen-5-yl)(adamantylamido)titanium dimethyl; dimethylsilylene(2,2,6-trimethyl-1,2,3,5-tetrahydro-s-indacen-5-yl)(cyclohexylamido)titanium dimethyl;

dimethylsilylene(2,2,6-trimethyl-1,2,3,5-tetrahydro-s-in-dacen-5-yl)(cyclododecylamido)titanium dimethyl; dimethylsilylene(2,2,6-trimethyl-1,2,3,5-tetrahydro-s-in-dacen-5-yl)(tert-butylamido)titanium dimethyl and any combination thereof.

Particularly useful fluorenyl-cyclopentadienyl group 4 complexes include:
dimethylsilylene(cyclopentadienyl)(2,7-di-tert-butyl-fluoren-9-yl)hafnium dimethyl;
dimethylsilylene(cyclopentadienyl)(3,6-di-tert-butyl-fluoren-9-yl)hafnium dimethyl;
diphenylmethylene(cyclopentadienyl)(2,7-di-tert-butyl-fluoren-9-yl)hafnium dimethyl;
diphenylmethylene(cyclopentadienyl)(3,6-di-tert-butyl-fluoren-9-yl)hafnium dimethyl;
isopropylidene(cyclopentadienyl)(2,7-di-tert-butyl-fluoren-9-yl)hafnium dimethyl;
isopropylidene(cyclopentadienyl)(3,6-di-tert-butyl-fluoren-9-yl)hafnium dimethyl;
dimethylsilylene(cyclopentadienyl)(2,7-dimethylfluoren-9-yl)hafnium dimethyl;
dimethylsilylene(cyclopentadienyl)(3,6-dimethylfluoren-9-yl)hafnium dimethyl;
diphenylmethylene(cyclopentadienyl)(2,7-dimethylfluoren-9-yl)hafnium dimethyl;
diphenylmethylene(cyclopentadienyl)(3,6-dimethylfluoren-9-yl)hafnium dimethyl;
dimethylsilylene(cyclopentadienyl)(fluoren-9-yl)hafnium dimethyl,
isopropylidene(cyclopentadienyl)(fluoren-9-yl)hafnium dimethyl,
diphenylmethylene(cyclopentadienyl)(fluoren-9-yl)hafnium dimethyl, and 1,1'-bis(4-triethylsilylphenyl)methylene(cyclopentadienyl)(2,7-di-tert-butyl-fluoren-9-yl)hafnium dimethyl.

In one embodiment, the oligomers with vinyl chain end can be produced using one or more activators in combination with one or more of the metallocene catalyst compounds. Preferred catalysts are described in U.S. Patent Publication Nos. 2014/213745 and 2015/0025209, incorporated herein by reference in their entirety. Most preferably metallocene catalyst compounds are those bridged (especially silyl- or germanyl-bridged) bis-cyclopentadienyl, bridged bis-indenyl, or bridged bis-tetrahydroindenyl zirconocenes or hafnocenes, most preferably those that are C1 to C6 substituted in one or two positions on each of the ring systems bound to the transition metal center.

In some embodiments, the metallocene may be represented by the formula:

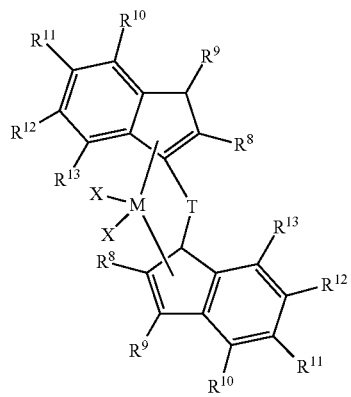

where M is hafnium or zirconium, preferably hafnium;
each X is, independently, selected from the group consisting of a substituted or unsubstituted hydrocarbyl radicals having from 1 to 20 carbon atoms, hydrides, amides, alkoxides, sulfides, phosphides, halides, dienes, amines, phosphines, ethers, and a combination thereof (two X's may form a part of a fused ring or a ring system); preferably each X is independently selected from halides and $C_1$ to $C_6$ hydrocarbyl groups, preferably each X is methyl, ethyl, propyl, butyl, phenyl, benzyl, chloride, bromide, or iodide;
each $R^8$ is, independently, a substituted or unsubstituted $C_1$ to $C_{10}$ alkyl group; preferably methyl, ethyl, propyl, butyl, pentyl, hexyl, heptyl, octyl, nonyl, decyl, or isomers thereof; preferably methyl, n-propyl, or n-butyl; or preferably methyl;
each $R^9$ is, independently, a substituted or unsubstituted $C_1$ to $C_{10}$ alkyl group; preferably methyl, ethyl, propyl, butyl, pentyl, hexyl, heptyl, octyl, nonyl, decyl, or isomers thereof; preferably methyl, n-propyl, or butyl; or preferably n-propyl;
each $R^{10}$ is hydrogen;
each $R^{11}$, $R^{12}$, and $R^{13}$, is, independently, hydrogen or a substituted or unsubstituted hydrocarbyl group, a heteroatom or heteroatom containing group; preferably each $R^{11}$, $R^{12}$, and $R^{13}$, is hydrogen;
T is a bridging group represented by the formula $R_2^aJ$ where J is C, Si or Ge, preferably Si;
each $R^a$ is, independently, hydrogen, halogen or a $C_1$ to $C_{20}$ hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated or saturated cyclic or fused ring system;
further provided that any two adjacent R groups may form a fused ring or multicenter fused ring system where the rings may be aromatic, partially saturated or saturated. T may also be a bridging group as defined above for $R_2^aT$; and further provided that any of adjacent $R^{11}$, $R^{12}$, and $R^{13}$ groups may form a fused ring or multicenter fused ring system where the rings may be aromatic, partially saturated or saturated.

Metallocene compounds that are particularly useful in this invention for producing oligomer with high vinyl chain end include one or more of:
rac-dimethylsilyl bis(2-methyl,3-propylindenyl)hafniumdimethyl,
rac-dimethylsilyl bis(2-methyl,3-propylindenyl)zirconiumdimethyl,
rac-dimethylsilyl bis(2-ethyl,3-propylindenyl)hafniumdimethyl,
rac-dimethylsilyl bis(2-ethyl,3-propylindenyl)zirconiumdimethyl,
rac-dimethylsilyl bis(2-methyl,3-ethylindenyl)hafniumdimethyl,
rac-dimethylsilyl bis(2-methyl,3-ethylindenyl)zirconiumdimethyl,
rac-dimethylsilyl bis(2-methyl,3-isopropylindenyl)hafniumdimethyl,
rac-dimethylsilyl bis(2-methyl,3-isopropylindenyl)zirconiumdimethyl,
rac-dimethylsilyl bis(2-methyl,3-butylindenyl)hafniumdimethyl,
rac-dimethylsilyl bis(2-methyl,3-butylindenyl)zirconiumdimethyl,
rac-dimethylgermanyl bis(2-methyl,3-propylindenyl)hafniumdimethyl, rac-dimethylgermanyl bis(2-methyl,3-propylindenyl)zirconiumdimethyl, rac-dimethylgermanyl bis(2-ethyl,3-propylindenyl)hafniumdimethyl, rac-dimethylgermanyl bis(2-ethyl,3-propylindenyl)zirconiumdimethyl, rac-dimethylgermanyl bis(2-methyl,3-ethylindenyl)hafniumdimethyl, rac-dimethylgermanyl bis(2-methyl,3-ethylindenyl)zirconiumdimethyl, rac-dimethylgermanyl bis(2-methyl,3-isopropylindenyl)hafniumdimethyl, rac-dimethylgermanyl bis(2-methyl,3-isopropylindenyl)zirconiumdimethyl, rac-dimethylgermanyl bis(2-methyl,3-butylindenyl)hafniumdimethyl, rac-dimethylgermanyl bis(2-methyl,3-propylindenyl)zirconiumdimethyl, rac-dimethylsilyl bis(2-propyl,3-methylindenyl)hafniumdimethyl, rac-dimethylsilyl bis(2-propyl,3-methylindenyl)zirconiumdimethyl, rac-dimethylsilyl bis(2-propyl,3-ethylindenyl)hafniumdimethyl, rac-dimethylsilyl bis(2-propyl,3-ethylindenyl)zirconiumdimethyl, rac-dimethylsilylbis(2-propyl,3-butylindenyl)hafniumdimethyl, rac-dimethylsilylbis(2-propyl,3-butylindenyl)zirconiumdimethyl, rac-dimethylsilyl bis(2-methyl,3-butylindenyl)hafniumdimethyl, rac-dimethylsilyl bis(2-methyl,3-butylindenyl)zirconiumdimethyl, rac-dimethylsilyl bis(2,3-dimethyl)hafniumdimethyl, rac-dimethylsilyl bis(2,3-dimethyl)zirconiumdimethyl, rac-dimethylgermanyl bis(2-propyl,3-methylindenyl)hafniumdimethyl, rac-dimethylgermanyl bis(2-propyl,3-methylindenyl)zirconiumdimethyl, rac-dimethylgermanyl bis(2-propyl,3-ethylindenyl)hafniumdimethyl, rac-dimethylgermanyl bis(2-propyl,3-ethylindenyl)zirconiumdimethyl, rac-dimethylgermanyl bis(2-propyl,3-butylindenyl)hafniumdimethyl, rac-dimethylgermanyl bis(2-propyl,3-butylindenyl)zirconiumdimethyl, rac-dimethylgermanyl bis(2-methyl,3-butylindenyl)hafniumdimethyl, rac-dimethylgermanyl bis(2-methyl,3-butylindenyl)zirconiumdimethyl, rac-dimethylgermanyl bis(2,3-dimethyl)hafniumdimethyl, rac-dimethylgermanyl bis(2,3-dimethyl)zirconiumdimethyl, and cyclotetramethylenesilylene-bis(2,4,7-trimethylinden-1-yl) hafnium dimethyl.

In an alternate embodiment, the "dimethyl" after the transition metal in the list of catalyst compounds above is replaced with a dihalide (such as dichloride or difluoride) or a bisphenoxide, particularly for use with an alumoxane activator.

In particular embodiments, the metallocene compound useful for producing oligomer with vinyl chain ends is rac-dimethylsilyl bis(2-methyl,3-propylindenyl) hafnium dimethyl (a), rac-dimethylsilyl bis(2-methyl,3-propylindenyl)zirconium dimethyl (b), represented by the formulae below:

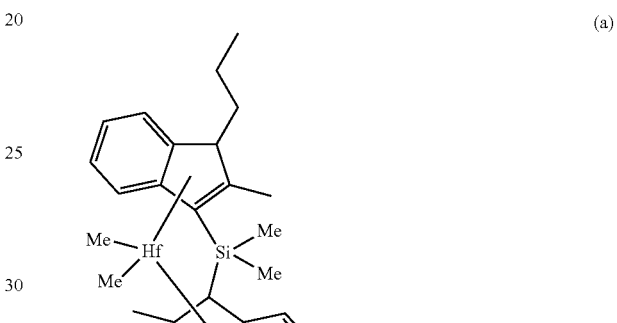

(a)

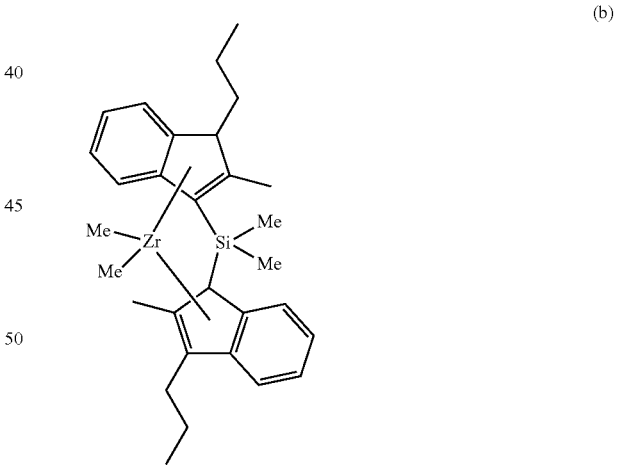

(b)

In an alternate embodiment, the "dimethyl" (Me$_2$) after the transition metal in the list of catalyst compounds above is replaced with a dihalide (such as dichloride or difluoride) or a bisphenoxide, particularly for use with an alumoxane activator.

In a preferred embodiment, the vinyl terminated propylene oligomer is produced via a process comprising: contacting propylene, under polymerization conditions, with a catalyst system, comprising an activator and at least one metallocene compound represented by the formula:

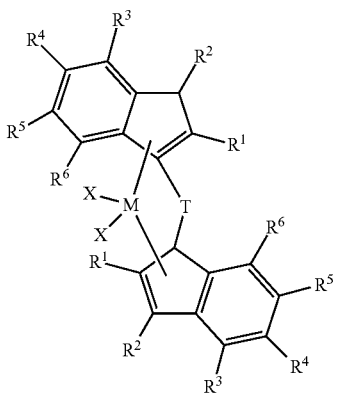

where M is hafnium or zirconium; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system); each $R^1$ is, independently, a $C_1$ to $C_{10}$ alkyl group; each $R^2$ is, independently, a $C_1$ to $C_{10}$ alkyl group; each $R^3$ is hydrogen; each $R^4$, $R^5$, and $R^6$, is, independently, hydrogen or a substituted hydrocarbyl or unsubstituted hydrocarbyl group, or a heteroatom; T is a bridging group; and any of adjacent $R^4$, $R^5$, and $R^6$ groups may form a fused ring or multicenter fused ring system where the rings may be aromatic, partially saturated or saturated; and obtaining a propylene oligomer having at least 50% vinyl chain ends (relative to total unsaturations).

In an embodiment, the oil extended ethylene alpha-olefin or ethylene, alpha-olefin and diene copolymers are derived from a vinyl terminated olefin oligomer. The oligomers are produced in a separated polymerization zone. In a preferred embodiment, the vinyl terminated olefin oligomer is produced using a process comprising: 1) contacting:
 a) one or more olefins with
 b) a transition metal catalyst compound represented by the formula:

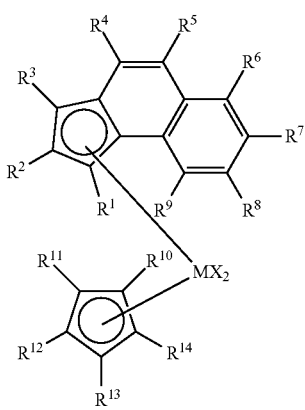

wherein
M is hafnium or zirconium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;

each $R^1$ and $R^3$ are, independently, a $C_1$ to $C_8$ alkyl group; and
each $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted or unsubstituted hydrocarbyl group having from 1 to 8 carbon atoms, provided however that at least three of the $R^{10}$-$R^{14}$ groups are not hydrogen; and
2) obtaining vinyl terminated oligomers having an Mn of 300 g/mol or more and at least 30% vinyl chain ends (relative to total unsaturation), as described in U.S. Ser. No. 13/072,249, filed Mar. 25, 2011, which is incorporated herein by reference.

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Particular activators include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Other ranges may include from 1:1 to 1000:1, such as 1:1 to 500:1. For instance, activator may be employed at any one of about 500, 450, 400, 350, 300, 250, 200, 150, 100, 50, 25, and 1 mole(s) or less, per mole catalyst compound.

In an alternate embodiment, little or no alumoxane is used in the polymerization processes described herein. In particular, alumoxane may be present at zero mole %.

In addition or instead, the catalyst systems of this invention can include at least one non-coordinating anion (NCA) activator. Non-coordinating anions useful in accordance with this invention are those that are compatible, stabilize the transition metal cation in the sense of balancing its ionic charge at +1, and yet retain sufficient lability to permit displacement during polymerization. Detailed descriptions of boron containing NCA activators can be found in U.S. Application Ser. No. 62/103,372, filed on Jan. 14, 2015, incorporated herein by reference in its entirety.

For a list of suitable bulky activators, see U.S. Pat. No. 8,658,556, incorporated by reference herein. Particular examples of suitable NCA activators include: N,N-dimethylaninlium tetrakis(pentafluorophenyl)borate; N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, triphenylcarbenium tetrakis (perfluorophenyl)borate, [$Ph_3C^+$][$B(C_6F_5)_4^-$], [$Me_3NH^+$][$B(C_6F_5)_4^-$]; 1-(4-(tris(pentafluorophenyl)borate)-2,3,5,6-tetrafluorophenyl)pyrrolidinium; tetrakis (pentafluorophenyl)borate, 4-(tris(pentafluorophenyl) borate)-2,3,5,6-tetrafluoropyridine, bis($C_4$-$C_{20}$alkyl) methylammonium tetrakis(pentafluorophenyl)borate and bis (hydrogenated tallowalkyl)methylammonium tetrakis (pentafluorophenyl)borate.

In another embodiment, one or more of the NCAs is chosen from the activators described in U.S. Pat. No. 6,211,105.

Any of the activators described herein may optionally be mixed together before or after combination with the catalyst compound, preferably before being mixed with either or both of the catalyst compounds for ethylene copolymers and oligomers.

In some embodiments, the same activator or mix of activators may be used for the catalyst compounds. In other embodiments, however, different activators or mixtures of activators may be used for each of the catalyst compounds in system where multiple catalysts are used. For example, in one embodiment: (i) an activator such as N,N-dimethylanilinium tetrakis(perfluoronaphthyl)borate may be used to activate one catalyst compound; and (ii) an activator such as N,N-dimethylanilinium tetrakis(pentafluorophenyl)borate may be used to activate another catalyst compound used in the same polymerization process.

Further, the typical activator-to-catalyst ratio for each catalyst is a 1:1 molar ratio. Alternate preferred ranges include from 0.1:1 to 100:1. For instance, activator-to-catalyst ratio may be any one of about 0.5, 1, 2, 5, 10, 50, 75, 100, 200, 250, 300, 350, 400, 450, 500, 600, 700, 800, 900, and 1000 to 1. According to some embodiments, activator-to-catalyst ratio may be within a range between any two of the foregoing.

It is also within the scope of this invention that the catalyst compounds can be combined with combinations of alumoxanes and NCAs.

In some embodiments, the activator(s) is/are contacted with a catalyst compound to form the catalyst system comprising activated catalyst and activator or other charge-balancing moiety, before the catalyst system is contacted with one or more monomers. In other embodiments, the activator(s) may be co-fed with catalyst compound(s), and catalyst/activator contact occurs in the feed line. Alternatively, the catalyst and activator are fed separately into a polymerization reactor, and catalyst is activated in the polymerization reactor. In embodiments wherein two catalyst systems are utilized in one polymerization zone (e.g., in a process using a multiple catalyst system as described in more detail below, such as a dual catalyst system), each of the catalyst compounds may be contacted with their respective activator(s) (which, again, may be the same or different) before being mixed together. Where the same activator is used for each, a mixture of catalysts may be contacted with activator (either before or along with feeding of monomers to the catalyst mixture).

Optional Scavengers or Co-Activators

In addition to the activator compounds, scavengers or co-activators may be used in the catalyst systems. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc may be used.

Polymerization Reaction Configurations and Conditions

In particular of these embodiments, a multiple reactor process is employed to produce the oligomer in one reactor, while a second reactor in series produces the high Mooney viscosity ethylene copolymer. The process for the preparation of the reactor blend comprises: contacting in a first reactor activated metallocene catalyst with propylene thereby producing an effluent containing oligomers; feeding the effluent to a second reactor wherein activated metallocene catalyst (can be same or different from the first catalyst) is contacted with additional ethylene, propylene and optional diene to produce a second polymer component and final product; and controlling conditions in each reactor in order to obtain the oligomer and the high Mooney viscosity second polymer component.

Where two catalysts are employed in the same reaction zone, preferably, at least one of the catalysts is able to incorporate more oligomer than other catalysts so that the polymers produced will have different densities. It is generally known that when certain transition metals compounds are activated with a suitable activator, have poor alpha-olefins incorporation and hence will produce higher density ethylene copolymers with oligomer.

Parallel polymerization is also contemplated according to some embodiments. For instance, a first polymerization zone comprising a catalyst system may produce oligomers, and a second polymerization zone may produce the ethylene copolymer. At least a portion of each of the first and second polymer products may be blended or otherwise combined to form a polymer composition.

A multiple-reactor system (e.g., serial or parallel polymerizations) according to some embodiments provides flexibility to control the molecular properties of the resulting polymer composition through adjusting process variables. Molecular weight, monomer content (e.g., ethylene content where ethylene is a first monomer), as well as the ratio of each polymer product blended into the resulting polymer composition all can be controlled though reaction temperature, catalyst feed rate and monomer concentration in each reactor. In one embodiment, the reaction temperature in a first polymerization zone is lower than the temperature in a second polymerization zone. The volume of reactor is another variable useful for adjusting the ratio of two ethylene copolymers.

Each of the various polymerization processes of this invention can be carried out using general polymerization techniques known in the art. Any suspension, homogeneous, bulk, solution, slurry, or gas phase polymerization process known in the art can be used. Such processes can be run in a batch, semi-batch, or continuous mode. Homogeneous polymerization processes is preferred. A homogeneous polymerization process is defined to be a process where at least 90 wt % of the product is soluble in the reaction media. A bulk process is defined to be a process where the monomer itself is used as the reaction medium and monomer concentration in all feeds to the reactor is 70 volume % or more. Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Since either batch or continuous polymerization processes may be used in accordance with these embodiments of the invention, references herein to monomer ratios and ratios of monomer feed rates should be considered interchangeable. For instance, where a ratio between a first monomer and second monomer to be copolymerized is given as 10:1, that ratio may be the ratio of moles present in a batch process, or the ratio of molar feed rates in a continuous process. Similarly, where catalyst ratios are given, such ratios should be considered as ratios of moles present in a batch process, or equivalently as ratios of molar feed rates in a continuous process.

Furthermore, although known polymerization techniques may be employed, processes according to certain embodiments utilize particular conditions (e.g., temperature and pressure). Temperatures and/or pressures generally may include a temperature in the range of from about 0° C. to about 300° C. Example ranges include ranges from a low of any one of about 20, 30, 35, 40, 45, 50, 55, 60, 65, and 70° C. to a high of any one of about 100, 110, 120, 130, 140, 150, 160, 170, 180, 190, 200, 250, and 300° C. For example, polymerization temperatures may fall within the range of from about 40° C. to about 200° C., alternatively from about 45° C. to about 150° C., 70° C. to about 150° C., or, in particular embodiments, from about 70° C. to about 125° C. Pressure may depend on the desired scale of the polymerization system. For instance, in some polymerizations, pressure may generally range from about ambient pressure to 200 MPa. In various such embodiments, pressure may range from a low of any one of about 0.1, 1, 5, and 10 to a high of any one of about 3, 5, 10, 50, 100, 150, and 200 MPa, provided the high end of the range is greater than the low end. According to such embodiments, pressure is preferably in a range of about 2 to about 70 MPa.

In a typical polymerization, the run time (also referred as to residence time) of the reaction is up to 300 minutes, preferably in the range of from about 5 to 250 minutes, or preferably from about 10 to 120 minutes. Alternatively, the run time of reaction may preferably be in a range of 5 to 30 minutes when a solution process is employed. The run time of reaction is preferably in a range of 30 to 180 minutes when a slurry or gas phase process is employed. The run time of reaction and reactor residence time are used interchangeably herein.

In some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa). Alternatively, 500 ppm or less, or 400 ppm or less, or 300 ppm of less of hydrogen is added into the reactor. In another embodiment, at least 50 ppm of hydrogen is added, or 100 ppm, or 200 ppm. Thus, certain embodiments include hydrogen added to the reactor in amounts ranging from a low of any one of about 50, 100, 150, and 200 ppm to a high of any one of about 250, 300, 350, 400, 450, and 500 ppm.

In some embodiments, the activity of catalyst system is at least 50 g/mmol/hour, preferably 500 or more g/mmol/hour, preferably 5000 or more g/mmol/hr, preferably 50,000 or more g/mmol/hr, preferably 100,000 or more g/mmol/hr. Alternatively, the catalyst efficiency is 10,000 kg of polymer per kg of catalyst or more, preferably, 50,000 kg of polymer per kg of catalyst or more, more preferably 100,000 kg of polymer per kg of catalyst or more.

Other additives may also be used in the polymerization, as desired, such as one or more scavengers, promoters, modifiers, chain transfer agents (such as dialkyl zinc, typically diethyl zinc), reducing agents, oxidizing agents, hydrogen, aluminum alkyls, or silanes.

A polymer can be recovered from the effluent of any one or more polymerizations by separating the polymer from other constituents of the effluent using conventional separation means. For example, polymer can be recovered from a polymerization effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Suitable antioxidants include, but are not limited to, phenyl-beta-naphthylamine; di-tert-butylhydroquinone, triphenyl phosphate, heptylated diphenylamine, 2,2'-methylene-bis (4-methyl-6-tert-butyl) phenol, and 2,2,4-trimethyl-6-phenyl-1,2-dihydroquinoline. Other methods of recovery such as by the use of lower critical solution temperature (LCST) followed by devolatilization are also envisioned. The catalyst may be deactivated as part of the separation procedure to reduce or eliminate further uncontrolled polymerization downstream the polymer recovery processes. Deactivation may be effected by the mixing with suitable polar substances such as water, whose residual effect following recycle can be counteracted by suitable sieves or scavenging systems.

Additional Compounds

In another embodiment, the polymer composition produced herein further includes one or more additional polymers and/or additives, thereby forming a compounded polymer composition. Thus, processes of various embodiments may further include blending a polymer composition according to various above-described embodiments (e.g., a polymer composition of some embodiments) with one or more additional polymer components and/or additives.

Useful additional polymer components include polyethylene, isotactic polypropylene, syndiotactic polypropylene, random copolymer of propylene and ethylene, and/or butene, and/or hexene, polybutene, ethylene vinyl acetate, low-density polyethylene (LDPE), linear low-density polyethylene (LLDPE), high-density polyethylene (HDPE), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In some embodiments, the additional polymer component or components is/are present in the above compounded polymer compositions, at from about 1 to about 99 wt %, based upon the weight of all polymers in the compounded polymer composition, for instance about 1 to about 10 wt %, in some embodiments. In other embodiments, the additional polymer component or components is/are present from any one of about 1, 2, 3, 4, 5, 6, 7, 8, 9, 10, 11, 12, 13, 14, 15, 16, 17, 18, 19, and 20 wt %, to any one of about 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, and 99 wt %, based upon the total weight of polymers in the compounded polymer composition.

Suitable additives may also be included in a compounded polymer composition. Such additives include any additive known in the art for elastomer formulations, such as EPDM formulations. Examples of additives include, but are not limited to, any one or more of: additional extender oils; carbon black; plasticizers; processing aids such as fatty acids, waxes, and the like; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); curatives (either or both of curing agents and co-agents, such as zinc oxide, peroxides, phenolic resins, and the like); fillers (including calcium carbonate, clay, silica and the like); antiozonants; scorch inhibiting agents; anti-cling additives; tackifiers (such as polybutenes, terpene resins, aliphatic and aromatic hydrocarbon resins, alkali metal and glycerol stearates, and hydrogenated rosins, and the like); UV stabilizers; heat stabilizers; anti-blocking agents; release agents; anti-static agents; pigments; colorants; dyes; talc; and other additives known in the art.

In general, any additional polymer component and/or any additive or other additional component suitable for a conventional EP or EPDM formulation will be suitable for compounding with polymer compositions of various embodiments described herein, particularly those embodiments in which the polymer composition is or comprises an EP or EPDM copolymer.

The compounded polymer compositions described above may be produced by mixing the polymer compositions of various embodiments with one or more additional polymers components (as described above), by connecting reactors together in series or in parallel to make reactor blends, or by using more than one catalyst in the same reactor to produce multiple species of polymer. The polymers can be mixed together prior to being put into an extruder or may be mixed in an extruder. Additives may optionally be added at any point in the process as is known in the art.

The compounded polymer compositions may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder.

In an embodiment, the amount of oil produced in the inventive process may be sufficient and no further oil need to be added to form the vulcanizable rubber composition. In some applications, additional oil may be desired, in which case the oil may be added in amounts of up to about 80 parts by weight per 100 parts by weight based on the ethylene-alpha-olefin-non-conjugated-diene copolymer. Preferably, oil is added in the amount of about 5 to about 15 parts by weight of paraffinic extender oil per 100 parts by weight based on the ethylene copolymer.

Vulcanizing Ethylene Copolymers

The ethylene copolymer of embodiments the present invention can be vulcanized using a vulcanizing agent. Suitable vulcanizing agents include but are not limited to sulfur; sulfur chloride; sulfur dichloride; 4,4'-dithiodimorpholine; morpholine disulfide; alkylphenol disulfide; tetramethylthiuram disulfide; selenium dimethyldithiocarbamate; and organic peroxides such as dicumyl peroxide, 2,5-dimethyl-2,5-di(t-butylperoxy)hexane, 2,5-dimethyl-2,5-di(benzoylperoxy)-hexane, 2,5-dimethyl-2,5-(t-butylperoxy) hexyne-3, di-t-butylperoxide, di-t-butylperoxide-3,3,5-trimethylcyclohexane and t-butylhydroperoxide. Of these, preferred are sulfur, dicumyl peroxide, di-t-butylperoxide and t-butylperoxide-3,3,5-trimethylcyclohexane.

In case of sulfur cure, sulfur is preferably used in an amount of 0.1 to 10 parts by weight, and preferably from 0.5 to 5 parts by weight, per 100 parts by weight of the ethylene-a-olefin-non-conjugated-diene.

In case of peroxide cure, the organic peroxide is used in an amount of usually from 0.1 to 15 parts by weight, and preferably from 0.5 to 8 parts by weight, per 100 parts by weight of said copolymer.

The vulcanizing agent may be used, if necessary, in combination with a vulcanization accelerator and a vulcanization coagent. Examples of the vulcanization accelerator are N-cyclohexyl-2-benzothiazole-sufenamide, N-oxydiethylene-2-benzothiazole-sulfen-amide, N,N-diisopropyl-2-benzothiazole-sulfenamide, 2-mercaptobenzothiazole, 2-(2, 4-dinitrophenyl) mercaptobenzothiazole, 2-(2,6-diethyl-4-morpholinothio)benzothiazole, dibenzothiazyl-disulfide, diphenylguanidine, triphenylguanidine, di-o-tolylguanidine, o-tolyl-bi-guanide, diphenylguanidine-phthalate, an acetaldehyde-aniline reaction product, a butylaldehyde-aniline condensate, hexamethylenetetramine, acetaldehyde ammonia, 2-mercaptoimidazoline, thiocarbaniride, diethylthiourea, dibutylthiourea, trimethylthiourea, di-o-tolylthiourea, tetramethylthiuram monosulfide, teramethylthiuram disulfide, teraethylthiuram disulfide, terabutylthiuram disulfide, dipenta-methyl-enethiuram tetrasulfide, zinc dimethyldithiocarbamate, zinc diethyl-thiocarbamate, zinc di-n-butylthiocarbamate, zinc ethylphenyldithiocarbamate, zinc butylphenyl-dithiocarbamate, sodium dimethyldithiocarbamate, selenium dimethyl-dithiocarbamate, tellurium diethyldithiocarbamate, zinc dibutylxanthate and ethylenethiourea. The vulcanization accelerator if used is used preferably in an amount of from 0.1 to 20 parts by weight, and in particular from 0.2 to 10 parts by weight, per 100 parts by weight of the ethylene-a-olefin-non-conjugated-diene.

Examples of the vulcanization coagent are metal oxides such as magnesium oxide and zinc oxide. Of these, preferred is zinc oxide. The vulcanization coagent is used usually in an amount of from 2 to 20 parts by weight per 100 parts by weight of the ethylene-a-olefin-non-conjugated-diene.

When peroxides are used as the vulcanizing agent, examples of cross-linking coagent or activator are cyanurate compounds, such as triallyl cyanurate (TAC) and triallylisocyanurate (TAIC), (meth)acrylate compounds, such as trimethylolpropane-trimethacrylate (TMPT or TRIM) and ethyleneglycloldimethacrylate (EDMA), zinc-dimethacrylate (ZDMA) and zincdiacrylate (ZDA), divinylbenzene, p-quinonedioxime, m-phenylene dimaleimide (HVA-2), (high vinyl) polybutadiene, and combinations thereof. When peroxides are used as the vulcanizing agent in addition, preferably sulphur (elementary or as part of sulphur accelerators or donors) can be used to obtain so called hybrid curing systems. These curing systems combine high heat resistant properties, typical for peroxide cure, with very good ultimate properties, such as tensile and tear, as well as excellent dynamic and fatigue properties typically associated with sulphur curing systems. Applied dosing levels of sulphur are preferably from 0.05 to 1.0 parts by weight, preferably from 0.2 to 0.5 parts by weight per 100 parts by weight based on the ethylene-a-olefin-non-conjugated-diene copolymer.

The vulcanizable rubber composition might in addition also contain other ingredients, such as antioxidants (e.g., TMQ), dessicants (e.g., CaO), tackyfiers (e.g., resin), bonding agents, pigments, process aids (e.g., factice, fatty acids, stearates, poly- or di-ethylene glycol). The present invention also relates to a vulcanized rubber article made from the vulcanizable rubber composition of the present invention. Such a vulcanized rubber article is preferably an engine mount.

Any of the foregoing polymers, including compounds thereof, may be used in a variety of end-use applications. Such applications include, for example, weather seals, coolant hoses, roofing membranes, wire and cable insulation, and dynamically vulcanized alloys, power transmission belts, engine mounts, thermoplastic blend and the like.

Test Methods

Small Amplitude Oscillatory Shear (SAOS): Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting compression-molded sample of resin (polymer composition) onto the parallel plates. To determine the samples' viscoleastic behavior, frequency sweeps in the range from 0.01 to 385 rad/s were carried out at a temperature of 190° C. under constant strain of 10%. A nitrogen stream was circulated through the sample oven to minimize chain extension or cross-linking during the experiments. A sinusoidal shear strain is applied to the material. If the strain amplitude is sufficiently small the material behaves linearly. As those of ordinary skill in the art will be aware, the resulting steady-state stress will also oscillate sinusoidally at the same frequency but will be shifted by a phase angle $\delta$ with respect to the strain wave. The stress leads the strain by $\delta$. For purely elastic materials $\delta=0°$ (stress is in phase with strain) and for purely viscous materials, $\delta=90°$ (stress leads the strain by 90° although the stress is in phase with the strain rate). For viscoleastic materials, $0<\delta<90$. Complex viscosity, loss modulus (G") and storage modulus (G') as function of frequency are provided by the small amplitude oscillatory shear test. Dynamic viscosity is also referred to as complex viscosity or dynamic shear viscosity. The phase or the loss angle $\delta$, is the inverse tangent of the ratio of G" (shear loss modulus) to G' (shear storage modulus).

Shear Thinning Ratio: Shear-thinning is a rheological response of polymer melts, where the resistance to flow (viscosity) decreases with increasing shear rate. The complex shear viscosity is generally constant at low shear rates (Newtonian region) and decreases with increasing shear rate. In the low shear-rate region, the viscosity is termed the zero shear viscosity, which is often difficult to measure for polydisperse and/or LCB polymer melts. At the higher shear rate, the polymer chains are oriented in the shear direction, which reduces the number of chain entanglements relative to their un-deformed state. This reduction in chain entanglement results in lower viscosity. Shear thinning is characterized by the decrease of complex dynamic viscosity with increasing frequency of the sinusoidally applied shear. Shear thinning ratio is defined as a ratio of the complex shear viscosity at frequency of 0.1 rad/sec to that at frequency of 100 rad/sec.

Mooney Large viscosity (ML) and Mooney Relaxation Area (MLRA): ML and MLRA are measured using a Mooney viscometer according to ASTM D-1646, modified as detailed in the following description. A square sample is placed on either side of the rotor. The cavity is filled by pneumatically lowering the upper platen. The upper and lower platens are electrically heated and controlled at 125° C. The torque to turn the rotor at 2 rpm is measured by a torque transducer. Mooney viscometer is operated at an average shear rate of 2 s$^{-1}$. The sample is pre-heated for 1 minute after the platens are closed. The motor is then started and the torque is recorded for a period of 4 minutes. The results are reported as ML (1+4) 125° C., where M is the Mooney viscosity number, L denotes large rotor, 1 is the pre-heat time in minutes, 4 is the sample run time in minutes after the motor starts, and 125° C. is the test temperature.

The torque limit of the Mooney viscometer is about 100 Mooney units. Mooney viscosity values greater than about 100 Mooney unit cannot generally be measured under these conditions. In this event, a non-standard rotor design is employed with a change in Mooney scale that allows the same instrumentation on the Mooney viscometer to be used for more viscous polymers. This rotor that is both smaller in diameter and thinner than the standard Mooney Large (ML) rotor is termed MST—Mooney Small Thin. Typically when the MST rotor is employed, the test is also run at different time and temperature. The pre-heat time is changed from the standard 1 minute to 5 minutes and the test is run at 200° C. instead of the standard 125° C. Thus, the value will be reported as MST (5+4) at 200° C. Note that the run time of 4 minutes at the end of which the Mooney reading is taken remains the same as the standard conditions. According to EP 1 519 967, one MST point is approximately 5 ML points when MST is measured at (5+4@200° C.) and ML is measured at (1+4@125° C.). The MST rotor should be prepared as follows:

a. The rotor should have a diameter of 30.48+/−0.03 mm and a thickness of 2.8+/−0.03 mm (tops of serrations) and a shaft of 11 mm or less in diameter.

b. The rotor should have a serrated face and edge, with square grooves of 0.8 mm width and depth of 0.25-0.38 mm cut on 1.6 mm centers. The serrations will consist of two sets of grooves at right angles to each other (form a square crosshatch).

c. The rotor shall be positioned in the center of the die cavity such that the centerline of the rotor disk coincides with the centerline of the die cavity to within a tolerance of +/−0.25 mm A spacer or a shim may be used to raise the shaft to the midpoint.

d. The wear point (cone shaped protuberance located at the center of the top face of the rotor) shall be machined off flat with the face of the rotor.

The MLRA data is obtained from the Mooney viscosity measurement when the rubber relaxes after the rotor is stopped. The MLRA is the integrated area under the Mooney torque-relaxation time curve from 1 to 100 seconds. The MLRA is a measure of chain relaxation in molten polymer and can be regarded as a stored energy term which suggests that, after the removal of an applied strain, the longer or branched polymer chains can store more energy and require longer time to relax. Therefore, the MLRA value of a bimodal rubber (the presence of a discrete polymeric fraction with very high molecular weight and distinct composition) or a long chain branched rubber are larger than a broad or a narrow molecular weight rubber when compared at the same Mooney viscosity values.

Mooney Relaxation Area is dependent on the Mooney viscosity of the polymer, and increases with increasing Mooney viscosity. In order to remove the dependence on polymer Mooney Viscosity, a corrected MLRA (cMLRA) parameter is used, where the MLRA of the polymer is normalized to a reference of 80 Mooney viscosity. The formula for cMLRA is provided below $$cMLRA = MLRA\left(\frac{80}{ML}\right)^{1.44}$$

where MLRA and ML are the Mooney Relaxation Area and Mooney viscosity of the polymer sample measured at 125° C.

Mn ($^1$H NMR) is determined according to the following NMR method. $^1$H NMR data is collected at either room temperature or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45° C., 8 seconds between pulses and signal averaging 120 transients. Spectral signals are integrated and the number of unsaturation types per 1000 carbons is calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogen per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

In conducting the $^{13}$C NMR investigations, samples are prepared by adding 0.3 g sample to approximately 3 g of tetrachloroethane-d2 in a 10 mm NMR tube. The samples are dissolved and homogenized by heating the tube and its contents to 150° C. The data are collected using a Varian spectrometer, with corresponding $^1$H frequencies of either 400 or 700 MHz (in event of conflict, 700 MHz shall be used). The data are acquired using nominally 4000 transients per data file with a 10 second pulse repetition delay. To achieve maximum signal-to-noise for quantitative analysis, multiple data files may be added together. The spectral width was adjusted to include all the NMR resonances of interest and FIDs were collected containing a minimum of 32K data points. The samples are analyzed at 120° C. in a 10 mm broad band probe.

The amount of vinyl chain ends (also called % vinyl termination) is determined using $^1$H NMR at 120° C. using deuterated tetrachloroethane as the solvent on a 500 MHz machine and in selected cases confirmed by $^{13}$C NMR. Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl terminated propylene macromonomers in J American Chemical Society, 114, 1992, pp. 1025-1032 that are useful herein. The percent of vinyl chain ends is reported as the molar percentage of allylic vinyl groups relative to total moles of unsaturated chain ends.

Molecular weights (number average molecular weight (Mn), weight average molecular weight (Mw), and z-average molecular weight (Mz)) are determined using a Polymer Laboratories Model 220 high temperature GPC-SEC (gel permeation/size exclusion chromatograph) equipped with on-line differential refractive index (DRI), light scattering (LS), and viscometer (VIS) detectors. It uses three Polymer Laboratories PLgel 10 m Mixed-B columns for separation using a flow rate of 0.54 ml/min and a nominal injection volume of 300 microliter. The detectors and columns were contained in an oven maintained at 135° C. The stream emerging from the SEC columns was directed into the miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun, P. Brant, R. R. Chance, and W. W. Graessley, in Macromolecules, Volume 34, Number 19, pp. 6812-6820, (2001), incorporated herein by reference.

Solvent for the SEC experiment was prepared by dissolving 6 grams of butylated hydroxy toluene as an antioxidant in 4 liters of Aldrich reagent grade 1,2,4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/mL at room temperature and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc)=0.1048 for ethylene-propylene copolymers, and (dn/dc)=0.01048−0.0016 ENB for EPDM, where ENB is the ENB content in weight percent in the ethylene-propylene-diene terpolymer. The value (dn/dc) is otherwise taken as 0.1 for other polymers and copolymers. Units of parameters used throughout this description of the SEC method are: concentration is expressed in g/cm$^3$, molecular weight is expressed in g/mol, and intrinsic viscosity is expressed in dL/g.

The light scattering detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient (for purposes of this invention, $A_2$=0.0015 for ethylene homopolymer and $A_2$=0.0015−0.00001 EE for ethylene-propylene copolymers, where EE is the ethylene content in weight percent in the ethylene-propylene copolymer. $P(\theta)$ is the form factor for a mono-disperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and $\lambda$=690 nm.

Branching Index ($g'_{vis}$): A high temperature viscometer from Viscotek Corporation was used to determine specific viscosity. The viscometer has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, $[\eta]$, at each point in the chromatogram was calculated from the following equation:

$$\eta_s = c[\eta] + 0.3(c[\eta])^2$$

where c is concentration 5 and was determined from the DRI output.

The branching index (g'vis) is defined as the ratio of the intrinsic viscosity of the branched polymer to the intrinsic viscosity of a linear polymer of equal molecular weight and same composition, and was calculated using the output of the SEC-DRI-LS-VIS method as follows. The average intrinsic viscosity, $[\eta]_{avg}$, of the sample was calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'_{vis} = \frac{[\eta]_{avg}}{kM_v^\alpha}$$

The intrinsic viscosity of the linear polymer of equal molecular weight and same composition is calculated using Mark-Houwink equation, where the K and $\alpha$ are determined based on the composition of linear ethylene/propylene copolymer and linear ethylene-propylene-diene terpolymers using a standard calibration procedure. $M_v$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and $\alpha$ exponents.

Ethylene content is determined using FTIR according the ASTM D3900 and is not corrected for diene content. ENB is determined using FTIR according to ASTM D6047. The content of other diene can be obtained using $C^{13}$ NMR.

The fraction of oil unbonded chemically with the ethylene alpha-olefin elastomer is determined using Soxhlet extraction. The blend, in a paper thimble, was extracted in a Soxhlet apparatus with an azeotrope of acetone and cyclohexane in a ratio of 2:1 by volume as the solvent. Reflux was maintained for 24 hours. After evaporation of the solvent from residue, the weight loss by the sample was determined and this was taken as azeotrope solubles.

EXAMPLES

Polymerization Examples 1-10

The oil extended ethylene copolymers in Examples 1 to 5 were made in a continuous stirred-tank reactor system with two reactors configured in series. The first reactor was a 0.5-liter and the second reactor was a 1 liter. Both of the reactors were stainless steel autoclave equipped with a stirrer, a water cooling/steam heating element with a temperature controller, and a pressure controller. The reactor was maintained at a pressure in excess of the bubbling point pressure of the reactant mixture to keep the reactants in the liquid phase. The reactors were operated liquid full. Solvents and monomers were first purified over beds of alumina and molecular sieves. Purification columns were regenerated periodically whenever there was evidence of lower activity of polymerization. All liquid feeds were pumped into the reactors by a Pulsa feed pump. All liquid flow rates were controlled using Brooks mass flow controller. Ethylene was delivered as a gas solubilized in the chilled solvent/monomer mixture. The purified solvents and monomers were then chilled to about −15° C. by passing through a chiller before being fed into the reactors through a manifold. Solvent and monomers were mixed in the manifold and fed into reactor through a single tube. Similarly, activated catalyst solution was fed using separate ISCO syringe pumps.

The reactors were first prepared by continuously $N_2$ purging at a maximum allowed temperature, then pumping isohexane and scavenger solution through the reactor system for at least one hour. Monomers and catalyst solutions were then fed into the reactor for polymerization. Once the activity was established and the system reached equilibrium, the reactor was lined out by continuing operation of the system under the established condition for at least five times the mean residence time prior to sample collection. The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a gauge pressure of 2.7 MPa.

Catalyst used in the production of vinyl terminated oligomers was dimethyl silyl bis(2-methyl 3-propyl indenyl) hafnium dimethyl (catalyst A) and the activator used was N,N-dimethyl anilinium tetrakis (heptafluoro-2-naphthyl) borate. The catalyst used for the copolymerization of ethylene, prolyene and vinyl terminated oligomers was [di(p-triethylsilylphenyl) methylene] (cyclopentadienyl) (3,8-di-t-butylfluorenyl)hafnium dimethyl (catalyst B). Catalyst B was preactivated with N,N-dimethylanilinium tetrakis(pentafluorophenyl) borate. Both the metallocene catalysts were preactivated with the activator at a molar ratio of 1:1 in 900 ml of toluene. All catalyst solutions were kept in an inert atmosphere and fed into reactors using an ISCO syringe pump. Tri-n-octylaluminum (TNOAL) solution (available from Sigma Aldrich, Milwaukee, Wis.) was further diluted in isohexane and used as a scavenger. Scavenger feed rate was adjusted to maximize the catalyst efficiency.

In Examples 1 to 5, solvent, preactivated catalyst A solution, scavenger solution and propylene were fed into the first reactor to produce vinyl terminated propylene oligomers. The contents of the first reactor were transferred into the second reactor. Preactivated catalyst B solution, ethylene and additional solvent were fed into the second reactor. The catalyst feed rate was adjusted to achieve the yield and monomer conversion. Process conditions and analytical results are summarized in Table 1.

TABLE 1

| | Ex01 | Ex02 | Ex03 | Ex04 | Ex05 |
|---|---|---|---|---|---|
| 1st reactor for oligomer production | | | | | |
| Temperature (° C.) | 60 | 60 | 60 | 60 | 60 |
| Propylene feed rate (g/min) | 5 | 6 | 5 | 5 | 5 |
| Isohexane feed rate (g/min) | 16.7 | 16.7 | 16.7 | 16.7 | 16.7 |
| Catalyst A feed rate to 1st reactor (mole/min) | 1.832E−07 | 1.832E−07 | 1.832E−07 | 1.832E−07 | 1.832E−07 |
| Yield (g/min) | | | | | 2.05 |
| Conversion (%) | | | 19.6% | | 41.0% |
| Vinyl Chain end (%) | | | 96.7 | | |
| Mn NMR (g/mol) | | | 5049 | | |
| Mn_DRI (g/mol) | 6765 | | 4621 | | |
| Mw_DRI (g/mol) | 14937 | | 13423 | | |
| Mz_DRI (g/mol) | 26540 | | 25435 | | |
| MWD (Mw/Mn) | 2.21 | | 2.91 | | |
| Brookfield viscosity @190° C. (mPa · sec) | | | | | |
| 2nd Reactor for production of ethylene copolymers | | | | | |
| Temperature (° C.) | 130 | 130 | 120 | 130 | 120 |
| Ethylene feed rate (SLPM) | 6 | 8 | 6 | 8 | 6 |
| Catalyst B feed rate (mole/min) | 5.886E−08 | 5.886E−08 | 5.886E−08 | 8.829E−08 | 2.355E−07 |
| Isohexane feed rate (g/min) | 52.5 | 52.5 | 52.5 | 52.5 | 52.5 |
| Yield from 2nd reactor (g/min) | 8.24 | 9.19 | 8 | 11 | 8 |
| Conversion (%) | 69.9% | 61.1% | 71.7% | 77.4% | 91.0% |
| Ethylene (wt %) | 57.3 | 52.9 | 56.4 | 63.5 | 56.4 |
| ENB (wt %) | | | | | |
| ML (1 + 4) 125° C. (mu) | 43.5 | 58.8 | 42.4 | 75.5 | 97.5 |
| MLRA (mu-sec) | 711.1 | 685.9 | 907.7 | 1648.2 | 1108 |
| cMLRA (mu-sec) | 1,710 | 1,069 | 2,265 | 1,791 | 833 |
| Complex shear viscosity at 0.1 rad/sec and 190° C. (Pa s) | 900,546 | 754,602 | 1,111,020 | 1,639,510 | |
| Complex shear viscosity at 100 rad/sec and 190° C. (Pa s) | 2,676 | 2,980 | 2,464 | 3,640 | |
| Shear thinning ratio (—) | 337 | 253 | 451 | 450 | |
| Phase angle at G* = 100,000 Pa | 20.8 | 23 | 17.2 | 20 | |
| Mn_LS (g/mol) | 6,674 | 10,820 | 8,222 | 9,350 | |
| Mw_LS (g/mol) | 249,824 | 232,705 | 288,784 | 307,256 | |
| Mz_LS (g/mol) | 563,769 | 504,566 | 711,839 | 691,778 | |
| g'vis | | | | | |

| | Ex06 | Ex07 | Ex08 | Ex09 | Ex10 |
|---|---|---|---|---|---|
| 1st reactor for oligomer production | | | | | |
| Temperature (° C.) | 100 | 60 | 100 | 60 | 60 |
| Propylene feed rate (g/min) | 5 | 5 | 5 | 5 | 5 |
| Isohexane feed rate (g/min) | 16.7 | 16.7 | 16.7 | 14 | 14 |
| Catalyst A feed rate (mole/min) | 1.832E−07 | 1.832E−07 | 1.832E−07 | 1.832E−07 | 1.832E−07 |
| Yield (g/min) | 0.83 | 0.083 | 0.24 | | |
| Conversion (%) | 16.6% | 16.6% | 4.8% | | |
| Vinyl Chain end (%) | 95.0 | | | | |
| Mn NMR (g/mol) | 614 | | | | |
| Mn_DRI (g/mol) | 430 | | | | |
| Mw_DRI (g/mol) | 1013 | | | | |
| Mz_DRI (g/mol) | 7995 | | | | |
| MWD (Mw/Mn) | 2.36 | | | | |
| Brookfield viscosity @190° C. (mPa · sec) | | | | | |

TABLE 1-continued

| | 2nd reactor for production of ethylene copolymer | | | | |
|---|---|---|---|---|---|
| Temperature (° C.) | 120 | 120 | 120 | 120 | 110 |
| Ethylene feed rate (SLPM) | 6 | 6 | 6 | 6 | 8 |
| Propylene feed rate (g/min) | | | | | 3 |
| ENB feed rate (ml/min) | | | | 2 | 2 |
| Catalyst B feed rate (mole/min) | 2.355E−07 | 2.355E−07 | 2.355E−07 | 2.355E−07 | 2.355E−07 |
| Isohexane feed rate (g/min) | 52.5 | 55.2 | 55.2 | 55.2 | 55.2 |
| Yield from 2nd reactor (g/min) | 8.22 | 8.69 | 9.055 | 6.01 | 4.33 |
| Conversion (%) | 69.7% | 73.7% | 76.8% | 51.0% | 25.4% |
| Ethylene (wt %) | 60.2 | 64.8 | 65.8 | 44.2 | 46.7 |
| ENB (wt %) | | | | 2.4 | 2.2 |
| ML (1 + 4) 125° C. (mu) | 86.1 | | | | |
| MLRA (mu-sec) | 470.4 | 408.2 | 282.4 | | |
| cMLRA (mu-sec) | 423 | | | | |
| MST (5 + 4) at 200° C. | | 42 | 37.3 | | |
| Complex shear viscosity at 0.1 rad/sec and 190° C. (Pa s) | | 731,079 | 561,847 | | |
| Complex shear viscosity at 100 rad/sec and 190° C. (Pa s) | | 3,582 | 4,295 | | |
| Shear thinning ratio (—) | | 204 | 131.9 | | |
| Phase angle at G* = 100,000 Pa | | 23 | 28.4 | | |
| Mn_LS (g/mol) | | | | | |
| Mw_LS (g/mol) | | | | | |
| Mz_LS (g/mol) | | | | | |
| g'vis | | | | | |

The complex viscosity of the polymer produced in Example 01 to 04 was measured at a temperature of 190° C. over an angular frequency ranging from 0.01 to 385 rad/s. Significant shear thinning was observed for the inventive material. The ratio of the complex viscosity at a frequency of 0.1 rad/s to the complex viscosity at a frequency of 100 rad/s was more than 200 for all four ethylene copolymers. The shear thinning behavior is similar to branched EPDM made using Ziegler-Natta catalysts such as Vistalon™ 8600. Vistalon 8600 is the branched ethylene/propylene/ENB terpolymer (EPDM) having a bimodal MWD, a Mooney viscosity of 81 (1+4 at 125° C.) and ENB of 8.9 wt %, available from ExxonMobil Chemical Company. The shear rheology data shown in the figures for Vistalon 8600 was measured at a temperature of 200° C.

The Van Gurp-Palmen plots of the ethylene copolymers produced in Example 01 to 04 are shown in FIG. 1 in comparison with the Vistalon 8600. The inventive ethylene copolymers have lower phase angles than Vistalon 8600 over a wide range of complex shear modulus.

Ethylene copolymer made in Example 09 and 10 are EPDM with about 2 wt % of ENB content. These two products were produced under similar process condition as those used for Example 1 to 8, except that ENB was fed into the second reactor.

The ethylene copolymer made in Example 09 was subjected to Soxhlet extraction using the procedure described herein to remove the free oligomers. 25.2 wt % of azeotrope solubles was obtained. The oil (free oligomer) content in this sample was about 33.7 phr.

Some of the ethylene copolymer was also analyzed using GPC-IR technique for molecular weight and composition distribution. The free oil (un-incorporated into ethylene copolymer) in these samples was removed prior to GPC-IR analysis. A bimodal molecular weight and composition distributions were observed for samples tested. The bimodal nature was attributed to the two components of the ethylene copolymers. The lower molecular weight component was primarily derived from catalyst A made in the second reactor while the higher molecular weight component was primarily made by catalyst B. The distribution can be adjusted using process conditions.

The invention claimed is:

1. An oil extended ethylene alpha-olefin copolymer composition, comprising:
    extender oil comprising a portion of an olefin oligomer; and
    ethylene copolymer, wherein the ethylene copolymer incorporates another portion of the olefin oligomer;
    wherein the olefin oligomer is a propylene homo-oligomer or propylene co-oligomer, and wherein the olefin oligomer has a Mn of 200 g/mole to 15,000 g/mole; and
    wherein the composition has a Shear Thinning Ratio of greater than 100, a Phase Angle of less than 45 degrees in a complex shear modulus range of 50,000 Pa to 1,000,000 Pa, a Mooney Large Viscosity (1+4@125° C.) of greater than 40 Mooney units, and a Mooney Large Relaxation Area of greater than 500 Mooney unit·seconds.

2. The composition of claim 1, comprising two ethylene copolymers; wherein the first ethylene copolymer has a weight average molecular weight of less than 50,000 g/mole and the second ethylene copolymer has a weight average molecular weight of greater than 100,000 g/mole.

3. The composition of claim 2, wherein the first ethylene copolymer has an ethylene content less than that of the second ethylene copolymer.

4. The composition of claim 2, wherein the difference in ethylene content between the first ethylene copolymer and the second ethylene copolymer is greater than 5 wt %.

5. The composition of claim 1, wherein the composition has an ethylene content of 30 wt % to 80 wt %.

6. The composition of claim 1, wherein the oligomer is amorphous.

* * * * *